US011850512B2

(12) United States Patent
Guillan et al.

(10) Patent No.: US 11,850,512 B2
(45) Date of Patent: Dec. 26, 2023

(54) METHOD AND APPARATUS FOR PROVIDING A COMPUTER IMPLEMENTED GAME

(71) Applicant: KING.COM LIMITED, St. Julians (MT)

(72) Inventors: Borja Guillan, Barcelona (ES); Sebastian Knutsson, Stockholm (SE)

(73) Assignee: KING.COM LTD., St. Julians (MT)

( * ) Notice: Subject to any disclaimer, the term of this patent is extended or adjusted under 35 U.S.C. 154(b) by 0 days.

(21) Appl. No.: 17/508,580

(22) Filed: Oct. 22, 2021

(65) Prior Publication Data
US 2023/0126170 A1     Apr. 27, 2023

(51) Int. Cl.
*A63F 13/537*     (2014.01)
*A63F 13/21*     (2014.01)

(52) U.S. Cl.
CPC ............ *A63F 13/537* (2014.09); *A63F 13/21* (2014.09)

(58) Field of Classification Search
CPC ............................... A63F 13/537; A63F 13/21
See application file for complete search history.

(56) References Cited

U.S. PATENT DOCUMENTS

| | | | | |
|---|---|---|---|---|
| 6,315,660 | B1 * | 11/2001 | DeMar | G07F 17/3267 463/16 |
| 2006/0009283 | A1 * | 1/2006 | Englman | G07F 17/3211 463/25 |
| 2006/0076735 | A1 * | 4/2006 | Proch | A63H 17/262 273/298 |
| 2006/0111169 | A1 * | 5/2006 | Hornik | G07F 17/32 463/16 |
| 2006/0135243 | A1 * | 6/2006 | Englman | A63F 13/45 463/16 |
| 2007/0167239 | A1 * | 7/2007 | O'Rourke | G07F 17/32 463/42 |
| 2008/0161111 | A1 * | 7/2008 | Schuman | A63F 13/822 463/41 |
| 2013/0281189 | A1 * | 10/2013 | Gagner | G07F 17/3225 463/25 |
| 2015/0005054 | A1 * | 1/2015 | Smalley | A63F 13/69 463/25 |
| 2018/0185743 | A1 * | 7/2018 | Goldstein | A63F 3/00075 |
| 2019/0180553 | A1 * | 6/2019 | Herring | G07F 17/326 |
| 2021/0049869 | A1 * | 2/2021 | Chan | G07F 17/3213 |

OTHER PUBLICATIONS

Legendary Killers, "Hustle Castle: Best strategic squad and equipment combination for hot ashes", May 5, 2018, Youtube.com, at https://www.youtube.com/watch?v=cl6QAZ88sDc (last visited Nov. 4, 2022), pp. 1-4. (Year: 2018).*

* cited by examiner

*Primary Examiner* — Steve Rowland
(74) *Attorney, Agent, or Firm* — Saul Ewing LLP

(57) ABSTRACT

A computer device is configured to provide a computer implemented game. A display displays a game play screen with a game board in a first area and an upgradable image in a second area. First game objects to be collected during game play and in response one or more items are provided in the second area of the display. The upgradable image is upgraded via an upgrade screen. When a level of the computer implemented game is next played, the upgraded image is displayed in the second area of respective game play screen.

36 Claims, 13 Drawing Sheets

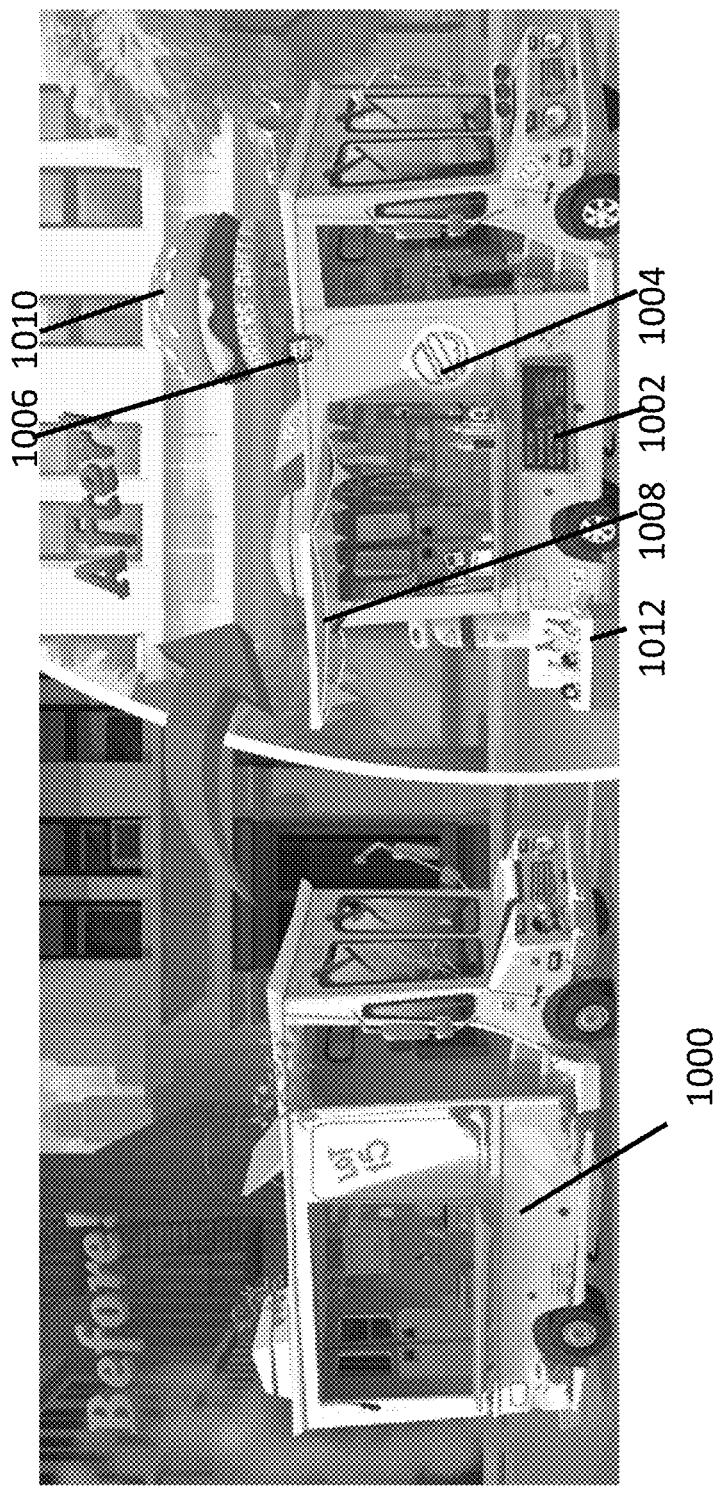

T1 Causing the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

T2 Causing by, the at least one processor in response to collecting of one or more first game objects, one or more items to be provided in the second area of the display, the items being used to satisfy one or more game objectives associated with the second area of the game play screen T3 Causing the display to display an image upgrade screen, different to the game play screen, the image upgrade screen having one or more options for upgrading the upgradable image T4 In response to user input received via the user interface selecting one or more of the options for upgrading the upgradable image, providing a first upgraded image, wherein when a respective level of the computer implemented game is played, the first upgraded image is displayed in the second area of the respective game play screen.

Figure 14

METHOD AND APPARATUS FOR PROVIDING A COMPUTER IMPLEMENTED GAME

FIELD OF THE INVENTION

Embodiments of this application relate to a user device and a server for use in playing a computer implemented game.

Some embodiments may relate to engaging users or players in a computer game executable in an online environment.

Some embodiments relate to controlling a user interface responsive to user engagement with displayed elements on the interface of a computer device.

The embodiments may have particular, but not exclusive application in the field of computer implemented applications including for example games, in an online or offline environment, and computing devices therefor.

BACKGROUND OF THE INVENTION

In the field of computer-implemented games, there are many technical challenges facing the designer of such games when considering how, for example, the user interface is to be controlled in the context of computer devices available to play the game.

One technical challenge can involve allowing a game to be fun and compelling even when there is limited display resource available, such as when a game is being played on a smartphone, tablet, or other minicomputer. Another significant challenge is that of user engagement. Engagement involves designing gameplay to be engaging and rewarding to players. This typically requires games to be easily understood at their simplest or introductory levels, providing rewarding gameplay with quite simple game mechanics, but becoming progressively more challenging so that players are not bored, but remain engaged and develop rewarding skills. Effective engagement requires various forms of feedback to reinforce player sense of success and accomplishment.

A technical challenge is to create a computer device and method which can support continuous user engagement and provide an engaging user experience.

Another technical challenge is how to retain casual game play where a user is able to play a game as and when they like while at the same time providing a sense of interaction.

A common genre of casual games is so-called match games. This is a type of tile-matching game where the player manipulates tiles or game objects according to a matching criterion.

A match-three game is a type of casual puzzle game where the player is required to find patterns on a seemingly chaotic board. The player then has to match three or more of the same type of game element on the game board and those matched elements will then disappear.

An existing type of match-three game is a so-called "switcher" game. In a switcher game, the player switches the place of two adjacent game elements on the game board so that one or both of them create a chain of at least three adjacent game elements of the same type. Those matched game elements will then disappear. The game board is then repopulated with game elements. One such known match three-type switcher game is known by the trademark Candy Crush Saga.

Another known type of game is "linker game", where a sequence of game elements sharing a matching characteristic are linked and removed from the game board.

Another example are the so called 'clicker' games where the player can click on a group of adjacent game elements of a certain type and those game element will then be removed. Some clicker games only require two adjacent elements to remove those elements if clicked by the user. Others may require more than two. To play the game, the user will, via a user interface, click on any group of two or more touching blocks satisfying a criteria. The criteria may be that the blocks share a matching characteristic. New blocks may or may not appear on the game board. The remaining game element blocks may drop down to fill gaps on the game board.

This patent specification describes not only various ideas and functions, but also their creative expression. A portion of the disclosure of this patent document therefore contains material to which a claim for copyright is made and notice is hereby given: Copyright King.com Limited 2021 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect computer device configured to provide a computer implemented game, the computer device comprising a display, a user interface, at least one memory, and at least one processor wherein: the at least one processor is configured to cause the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level; the at least one processor is configured, in response to collecting of one or more first game objects, cause one or more items to be provided in the second area of the display, the items being to satisfy one or more game objectives associated with the second area of the game play screen; the at least one processor is configured to cause the display to display an image upgrade screen, different to the game play screen, the image upgrade screen having one or more options for upgrading the upgradable image; and the at least one processor is configured in response to user input received via the user interface selecting one or more of the options for upgrading the upgradable image to provide a first upgraded image, wherein when a respective level of the computer implemented game is played, the first upgraded image is displayed in the second area of the respective game play screen.

The at least one upgrade option associated with the upgradeable image may provide a booster triggering option in a respective level of the computer implemented game.

The at least one processor may be configured to cause the at least one booster triggering option to be triggered in response to one or more criteria being satisfied by gameplay associated with the gameboard.

The at least one processor may be configured to cause one or more boosters to be provided on the game board in response to determining that the one or more criteria have been satisfied.

The at least one processor may be configured to cause the display to display a current appearance of the upgradable image on the image upgrade screen.

The upgradable image displayed in the second area of the game play screen may be of a food truck.

The upgradeable image displayed in the second area of the game play screen may be of an interior of a food truck.

The at least one processor may be configured to provide one or more options in the image upgrade screen for upgrading the interior of the food truck and one or more options for upgrading an exterior of the food truck.

The at least one processor may be configured to provide one or more points in response to each of the one or more items being provided in the second area of the display.

One or more of the items may be associated with a recipe.

One or more of the items may be associated with a plurality of levels, the level of a respective item determining a number of points provided by the respective item.

The at least one processor may be configured, in response to the providing of the item, to cause the associated number of points for the respective item to be used to progress to or towards a next level of the respective item.

The at least one processor may be configured when a respective item has reached a maximum level to cause one or more levels associated with the upgradable image to become available.

A respective option for upgrading the upgradeable image may be associated with a respective number of points, the at least one processor being configured to cause the respective number of points to be used when the respective option is selected.

The upgradable image may comprise a plurality of levels.

The at least one processor may be configured such that one or more different ones of the items can only be provided when the upgradable image has reached a respective level.

The at least one processor may be configured to select one of a plurality of different upgradable images to be displayed in the second area of the game play screen, different ones of the upgradable images being associated with different items.

The at least one processor may be configured to cause the display to display in the second area, one or more components related to the items to be provided.

The at least one processor may be configured to determine by the at least one processor that a first game object is collected in response to determining that a move made by a user via the user interface causes a match to be made on the game board adjacent a respective first game object.

The at least one processor may be configured to determine that a first game object is collected in response to determining that a move made by a user via the user interface causes a booster game object to be triggered, the triggering of the booster object causing the first game object to be collected.

According to another aspect there is a method provided by a computer device, the computer device having at least one processor, at least one memory, a display, and a user interface, the method comprising: causing, by the at least one processor, the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level; causing, by the at least one processor in response to collecting of one or more first game objects, one or more items to be provided in the second area of the display, the items being to satisfy one or more game objectives associated with the second area of the game play screen; causing, by the at least one processor, the display to display an image upgrade screen, different to the game play screen, the image upgrade screen having one or more options for upgrading the upgradable image; and in response to user input received via the user interface selecting one or more of the options for upgrading the upgradable image, providing by the at least one processor a first upgraded image, wherein when a respective level of the computer implemented game is played, the first upgraded image is displayed in the second area of the respective game play screen.

The at least one upgrade option associated with the upgradeable image may be configured to provide a booster triggering option in a respective level of the computer implemented game.

The method may comprise causing, by the at least one processor, the at least one booster triggering option to be triggered in response to one or more criteria being satisfied by gameplay associated with the gameboard.

The method may comprise causing, by the at least one processor, one or more boosters to be provided on the game board in response to determining that the one or more criteria have been satisfied.

The method may comprise causing, by the at least one processor, the display to display a current appearance of the upgradable image on the image upgrade screen.

The upgradable image displayed in the second area of the game play screen may be of a food truck.

The upgradeable image displayed in the second area of the game play screen may be of an interior of a food truck.

The method may comprise providing, by the at least one processor, one or more options in the image upgrade screen for upgrading the interior of the food truck and one or more options for upgrading an exterior of the food truck.

The method may comprise providing, by the at least one processor, one or more points in response to each of the one or more items being provided in the second area of the display.

One or more of the items may be associated with a recipe.

One or more of the items may be associated with a plurality of levels, the level of a respective item determining a number of points provided by the respective item.

The method may comprise causing, by the at least one processor in response to the providing of the respective item, to cause the associated number of points for the respective item to be used to progress to or towards a next level of the respective item.

The method may comprise causing, by the at least one processor when a respective item has reached a maximum level, one or more levels associated with the upgradable image to become available.

A respective option for upgrading the upgradeable image may be associated with a respective number of points, the method comprising causing, by the at least one processor, the respective number of points to be used when the respective option is selected.

The upgradable image may comprise a plurality of levels.

The method may comprise providing, by the at least one processor, one or more different ones of the items only when the upgradable image has reached a respective level.

The method may comprise selecting, by the at least one processor, one of a plurality of different upgradable images to be displayed in the second area of the game play screen, different ones of the upgradable images being associated with different items.

The at least one processor may be configured to cause the display to display in the second area, one or more components related to the items to be provided.

The method may comprise determining, by the at least one processor, that a first game object is collected in response to determining that a move made by a user via the user interface causes a match to be made on the game board adjacent a respective first game object.

The method may comprise determining, by the at least one processor, that a first game object is collected in response to determining that a move made by a user via the user interface causes a booster game object to be triggered, the triggering of the booster object causing the first game object to be collected.

According to another aspect, there is provided a non-transitory computer program product comprising instructions which, when implemented by the at least one processor, cause a computer device to be configured to provide a computer implemented game, the at least one processor being configured to: cause a display of the computer device to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level; cause, in response to collecting of one or more first game objects, one or more items to be provided in the second area of the display, the items being to satisfy one or more game objectives associated with the second area of the game play screen; cause the display to display an image upgrade screen, different to the game play screen, the image upgrade screen having one or more options for upgrading the upgradable image; and in response to user input received via the user interface selecting one or more of the options for upgrading the upgradable image, providing a first upgraded image, wherein when a respective level of the computer implemented game is played, the first upgraded image is displayed in the second area of the respective game play screen.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIG. 10*a* shows an example of a food truck prior to and after upgrading;

FIG. 14 shows another method of some embodiments.

DETAILED DESCRIPTION OF SOME EMBODIMENTS

The terms user and player are used interchangeably throughout this document and no specific meaning is intended using one or the other unless the context suggests otherwise.

In the following description of various implementations of the invention, reference is made to the accompanying drawings which form a part thereof, and in which are shown by way of illustration various implementations in which the invention may be utilized. It is to be understood that other implementations may be utilized, and structural and functional modifications may be made without departing from the scope of the present invention.

A person skilled in the art will realise that the different approaches to implementing the game is not exhaustive, what is described herein are certain preferred embodiments. It is possible to implement embodiments in a number of variations.

One example of a game with which embodiments may be used is a 'match-3 game' where the player is required to find patterns on a seemingly chaotic board. The player then has to match three or more of the same type of game element on the game board and those matched elements will then disappear. In some games the user has to match more than 3 game elements.

Figure 1:
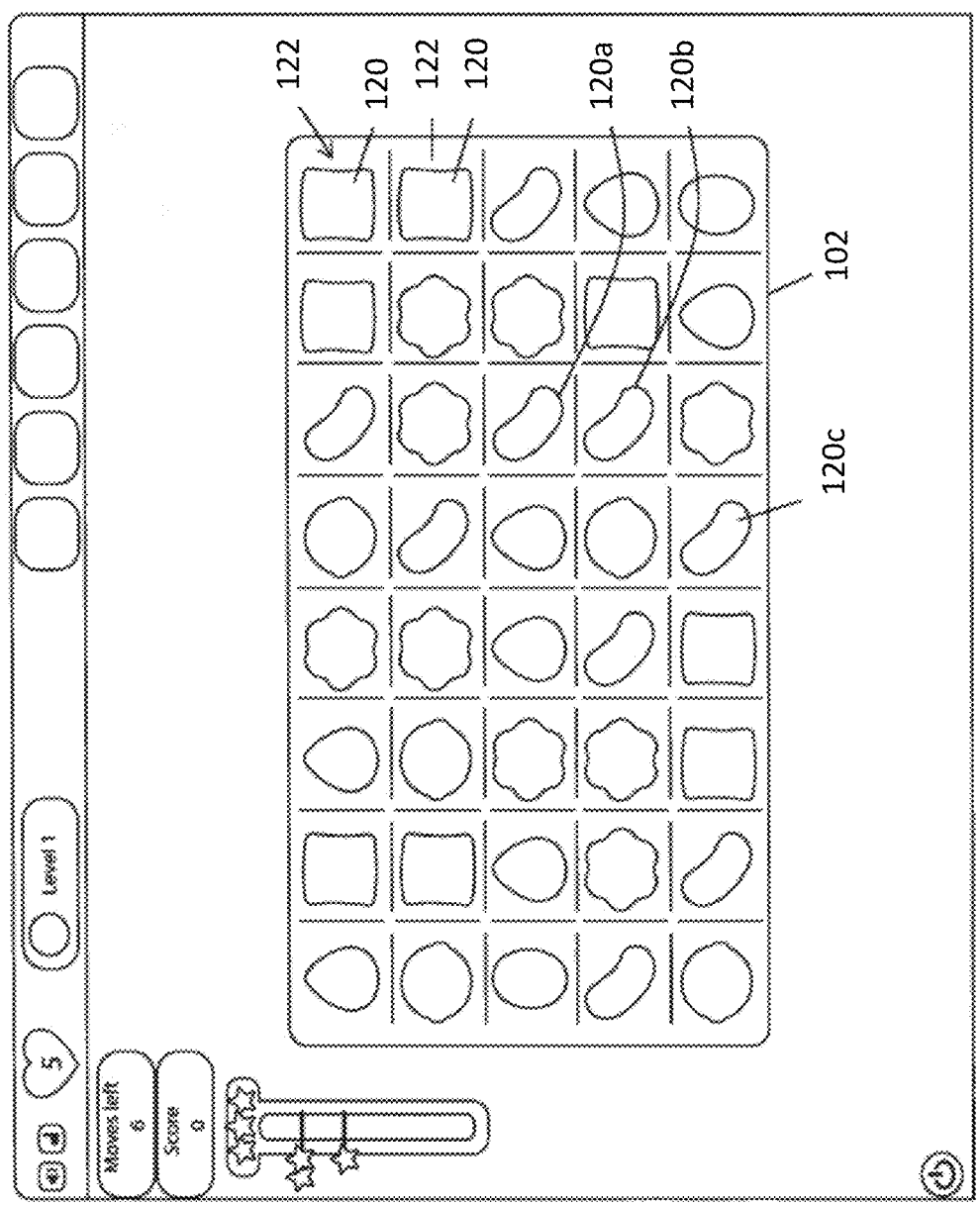
FIG. 1 shows a first example embodiment of a game board.

FIG. 1 shows a display of a match 3 switcher game. FIG. 1 illustrates a game board 102 with a plurality of game elements 120. The game elements are each of six different shapes and colours. Of course, in other embodiments, there may be more or less than six different game elements. Each game element type may be defined by one or more of particular matching characteristics, for example a particular shape and colour combination. Each game element is supported by a tile 122. The tiles may not be readily visible to a player of the game—the game elements are the main focus for a player. However, the tiles govern characteristics of the game elements which are visible to a player.

In a match 3 switcher game, the aim of the game is to swap game of the same type with each other to make moves on the game board. To gain points the player has to make moves that create matches of at least three of the same game element. In doing so, the matched game elements are removed. As a result game elements fall into place from the top of the game board in order to fill any spaces created. Assume in FIG. 1 that game element 120*c* is moved one place to the right to form a three-line match with game elements 120*a* and 120*b*. This has the effect of removing game elements 120*a*, 120*b* and 120*c*, creating a visual effect (for example an animation) on the screen to indicate the removal of the game elements. The two game elements which were directly above game elements 120*a* will now fall downwards into the spaces created by the removal of game elements 120*a*, 120*b* and 120*c*. The game elements on the newly created tiles which fall downwards into the game board are generated at random. The user then has a new game board on which to play a subsequent move.

Game elements may drop down from the top of the game board. In an alternative version the physics can vary so that the speed and/or direction of replacement game elements can alter. For example, the game board may be filled from below and/or from the sides. It should be appreciated that any suitable mechanism may be used to replace game elements which are removed from the game board as a result of a match being made.

Other examples of a casual social game are the so called 'clicker' games where the player can click on a group of adjacent game elements of a certain type and those will then be removed. Some clicker games only require two adjacent objects to remove those elements if clicked by the user. Others may require more than two.

Another type of match game are the so called 'shooter' games where the player launches for example a ball or bubble on to the game board trying to aim at groups of similar game elements already on the game board. If the launched ball hits or forms a group of more than 3 similar game elements then that group of game elements are removed from the game board.

Other embodiments may be used with any other suitable type of games. The previously described games are by way of example only.

In some embodiments, the game may be provided with different levels. Each level may have a specific goal. This will be discussed in more detail later.

Figure 2:
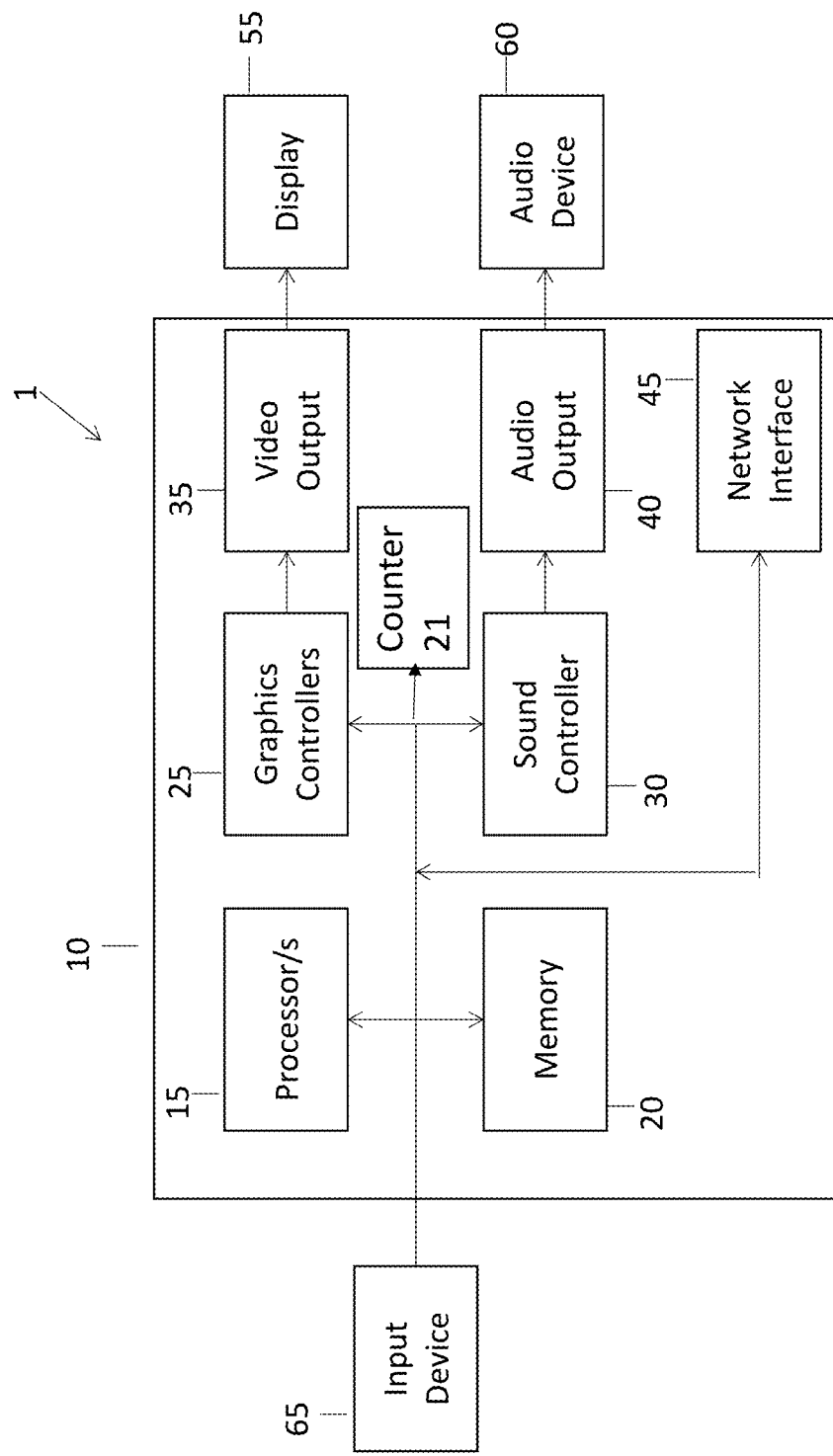
FIG. 2 shows an example user device in which some embodiments may be provided.

A schematic view of a user device 1 which may be configured to provide one or more embodiments is shown in FIG. 2. The user device may be configured to provide a computer implemented game. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may comprise one or more processor and/or be provided by the one or more processors 15. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

A counter 21 may be provided. The counter may be a hardware function, a software function, or a combination thereof. The counter may be provided by the at least one processor, in some embodiments. The counter may provide a count up function and/or a countdown function. The counter may be used to keep track of remaining moves and/or used up moves. The counter may be used to keep track of a number of items which have been collected or are to be collected.

The control part 10 has an interface 45 allowing the device to be able to communicate with a network such as the Internet or other communication infrastructure.

The device 1 has an input device or user interface 65. The input device can take any suitable format and can be one or more of a keyboard, mouse, touch screen, joystick, or game controller. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

The user device may be a so-called smart phone or tablet. In some embodiments, the user device may be relatively small with a relatively small touch screen or display.

Figure 3:
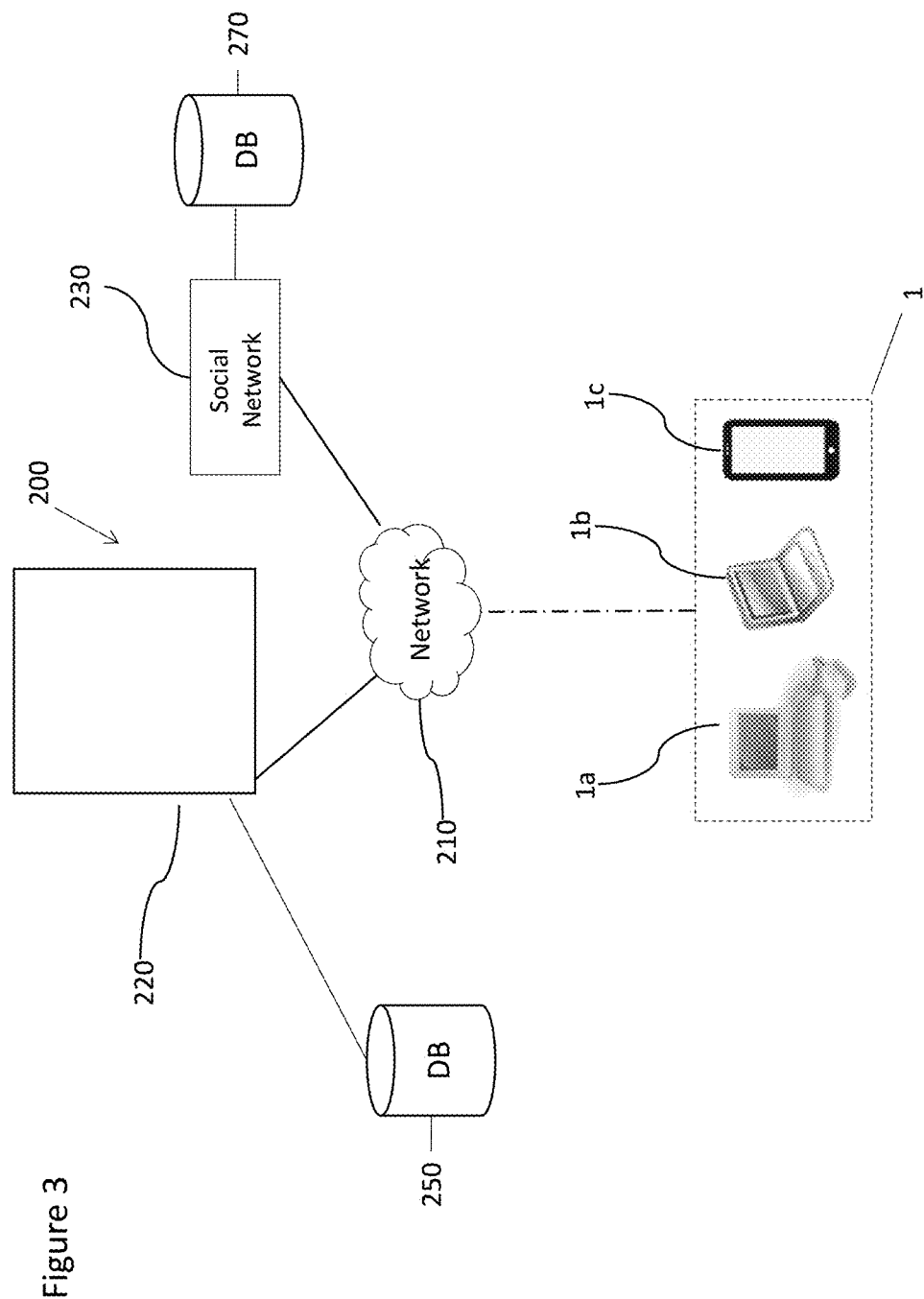
FIG. 3 shows an example system in which some embodiments may be provided.

FIG. 3 schematically shows a system 200 according to an embodiment. The system 200 comprises a server 220 which may store or be in communication with database 250 which may, in some embodiments, store game player's details, profiles, statistics etc. In practice, one or more databases 250 may be provided. In practice, one or more servers 220 may be provided. Where one or more server is provided, the database(s) 250 may be provided in one database 250 across two or more servers.

The server 220 may communicate via, for instance, the internet 210 to one or more client or user devices 1, shown in FIG. 3 by way of example as user devices 1*a*, 1*b* and 1*c*. The server 220 may have connections to a social network 230, for example, Facebook™. The connections may be via the network or via a direct connection. The social network 230 may also be connected to a database 270 storing social user interaction details, for instance, user to user interaction maps, friend lists, location history etc. In practice, one or more databases 270 may be provided. The connection to the database 270 of the social network 230 may result in a local copy of part of the database 270 being made on the user device 1.

It should be recognised by those skilled in the art that the databases herein referred to may comprise external or remote storage, such as that described as being in a "cloud".

It should be appreciated that embodiments may be deployed in different system architectures. For example, the computer game may be implemented as a computer game that is stored in the memory of the user device and is run on the processor of the user device. However, the server may handle some elements of the game in some embodiments. By way of example only, a Java game applet may be provided to the user device and the locally running Java applet will generate, for example, the graphics, sounds, and user interaction for the game play on the user device. Some data may be fed back to the server to allow interaction with other user devices. The data which is fed back may also allow scoring and/or cross platform synchronization.

In some embodiments, the game may be implemented as a computer program that is stored in a memory of the system, for example the server, and which runs on a processor of the game server. Data streams or updates are supplied to the user device to allow the user device to render and display graphics and sounds in a browser of the user device. Such an approach is sometimes referred to as a web services approach. It should be appreciated, however, that such an approach does not necessarily require the use of the Internet.

The game may be played in an offline mode on a handheld device using locally stored information on the handheld device. The device may store all or some of the levels that are available as applicable to the particular game and its objectives. Some of the features may be locally executed on the device.

Some embodiments may be provided in the context of so-called saga or similar games. These are games which have one or more levels. In some games, a user may be required to complete a certain level before the user is able to progress to a next level. In some embodiments, the user may be able to go back and play any previous level. A game may have a number of different levels. Different levels may have different requirements to be met. For example, some levels may have one or more specific goals. Some examples of goals will be described in more detail later.

In some embodiments, the game can be implemented so that a player progresses through multiple levels. The different levels may have different levels of difficulty in some embodiments. For example, the trend may be for the levels to become increasingly difficult. However, in some embodiments, the difficulty of individual levels may vary within the progression from easier to harder to easier and so on.

In some embodiments, the player moves between levels and completes the levels one by one by playing the associated game. When the player reaches the goal or objective of a level, the next level is unlocked and the player can play that level in the game.

The levels can be divided into groups. The number of groups and levels can vary depending on the implementation. The levels may be numbered consecutively throughout the game or they can be numbered within a group, it is also understood that other ways of identifying the levels can be provided.

One way of unlocking new groups is to complete the last level on the latest group. The user may in some embodiments be provided with challenges to unlock the next group.

In some embodiments, the user can play any of the unlocked levels, so the user can go back and replay already completed levels to get a better score or beat friends' high scores.

Figure 6:
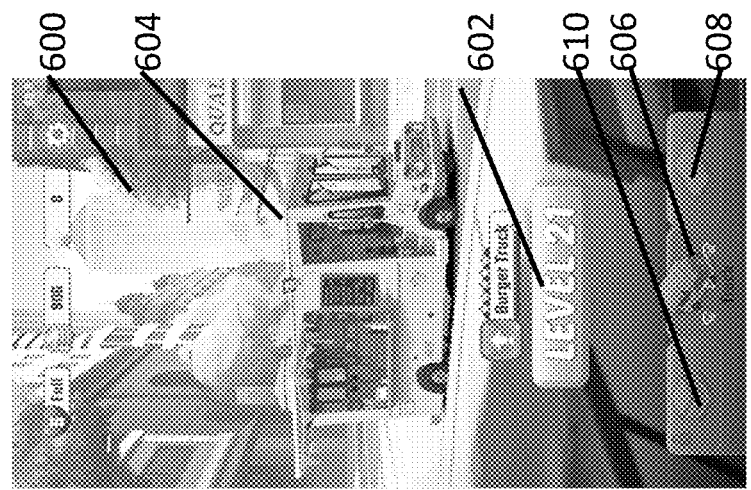
FIG. 6 which shows an example of a screen which allows a game level option to be selected.

Reference is made to FIG. 6 which shows a screen 600 which the at least one processor is configured to cause the display to display. This screen 600 has a first user selectable area 602 or button. When this user selectable area is selected by the user via the user interface, this causes the at least one processor to cause the display to display one or more screens which allow the user to play the selected level. The screen such as displayed in FIG. 6 may provide information about which level can be selected by the user to play. In the example shown in FIG. 6, the information is provided on the first user selectable area 602. In this example the level is level 21.

Figure 7:
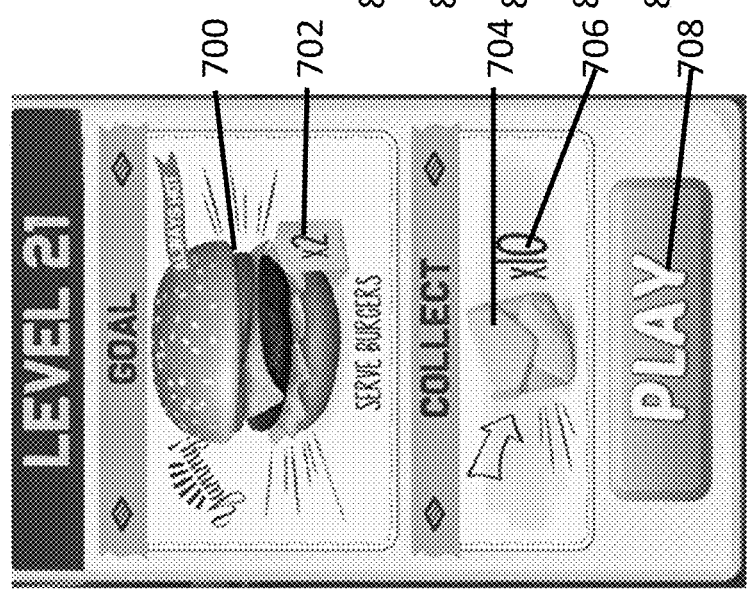
FIG. 7 shows an example screen displayed when the game level option of FIG. 6 is selected.

When the user selects the first selectable area 602, the at least processor is configured to cause the display to display the screen shown in FIG. 7. This screen will be discussed in more detail later.

Some embodiments are provided in the context of a food truck. The screen 600 shown in FIG. 6 has a food truck upgrade option 606 which is selectable by user input received via the user interface. When this food truck upgrade option is selected by user input received via the user interface, the at least one processor is configured to cause the screen shown in FIG. 8 to be displayed. This screen is discussed in more detail later.

Figure 9B:
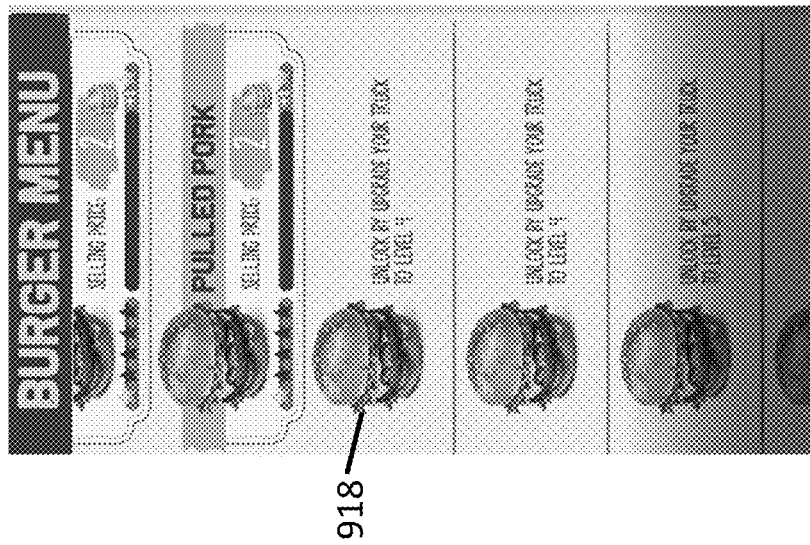
FIGS. 9*a* and 9*b* shows example screens displayed when the recipe menu option of FIG. 6 is selected.
Figure 9A:
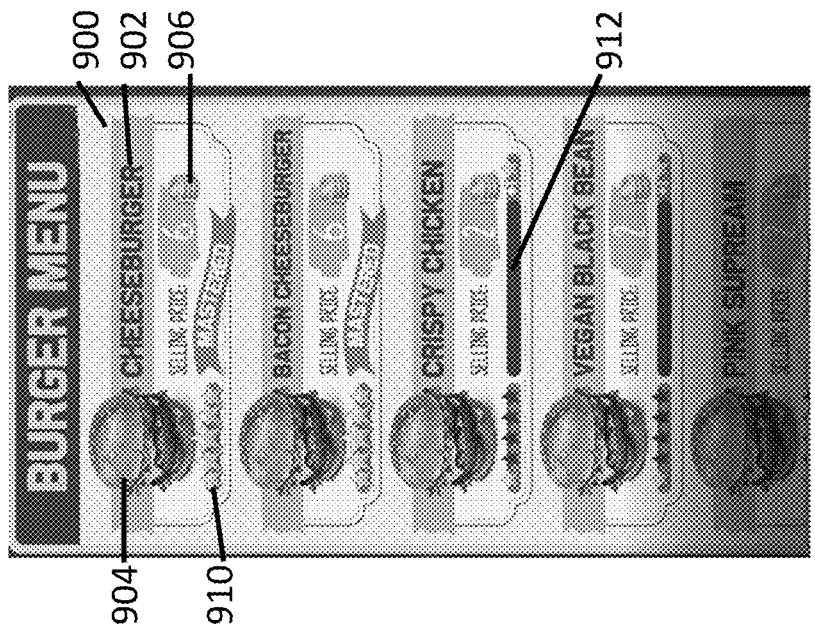

The screen 600 shown in FIG. 6 has a recipe menu option 608 which is selectable by user input received via the user interface. When this option is selected by the user input, at least one processor is configured to cause screens such as shown in FIGS. 9*a* and 9*b* to be displayed. This is discussed in more detail later.

Figure 12:
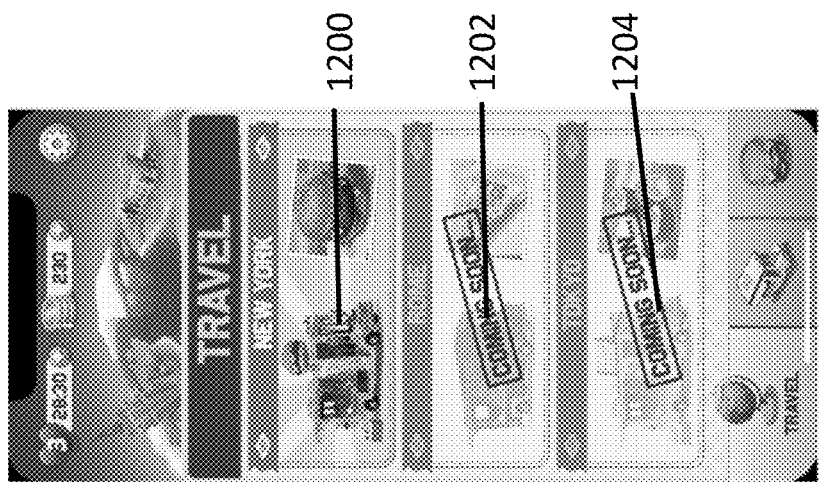
FIG. 12 shows an example screen which is displayed when the food truck option of FIG. 6 is selected.

The screen 600 shown in FIG. 6 has a food truck option 610 which is selectable by user input received via the user interface. When this option is selected by the user input, the at least one processor is configured to cause a screen such as shown in FIG. 12 to be displayed. This is discussed in more detail later.

Thus, when the user selects via the user interface the first selectable area 602, the at least processor is configured to cause the display to display the screen shown in FIG. 7. The at least one processor is configured to cause the screen to display information 700 about one or more items which are to be made, crafted or otherwise provided when playing the level. In the example of FIG. 7, burgers are to be made. Information may also be displayed as to the type of item to be made. This information may be provided by a visual indication of the item and/or with text information. For example, the burger may be a cheeseburger.

The at least one processor is configured to cause the display to display information 702 about the number of items which are to be made in order to complete the level. In the example of FIG. 7, 2 burgers are to be made.

The at least one processor is configured to cause the display to display an indication of a particular type of game object 704 which is be collected when playing the game in order to make the required number of items (two burgers in this example). In this example the game object is visualised as a grocery bag. In some embodiments, more than one particular type of game object may need to be collected.

The at least one processor is configured to cause the screen to display an indication 706 of the number of the particular type of game objects 704 which need to be collected when playing the level to cause the required number of items to be provided or made. Where more than one particular type of game object is to be collected, the number of each of those objects which need to be collected is displayed. The some or different numbers of the different particular type of game objects may need to be collected.

Figure 5C:
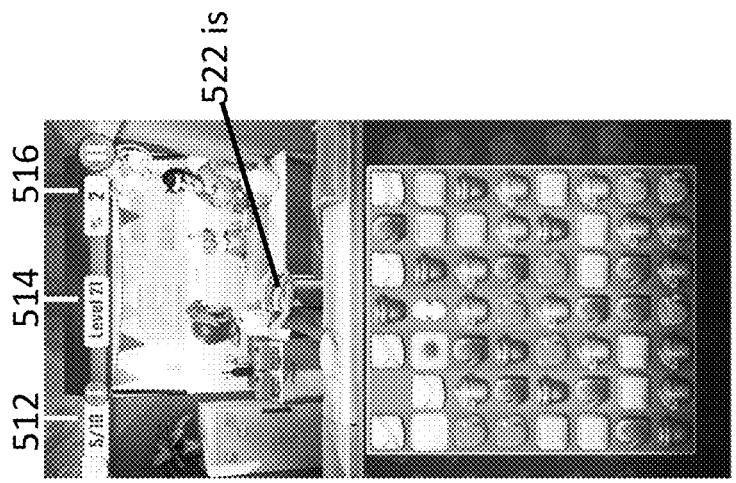
FIGS. 5*a* to 5*c* show examples of screens which are displayed while a user plays a level of a computer implemented game of some embodiments.
Figure 5B:
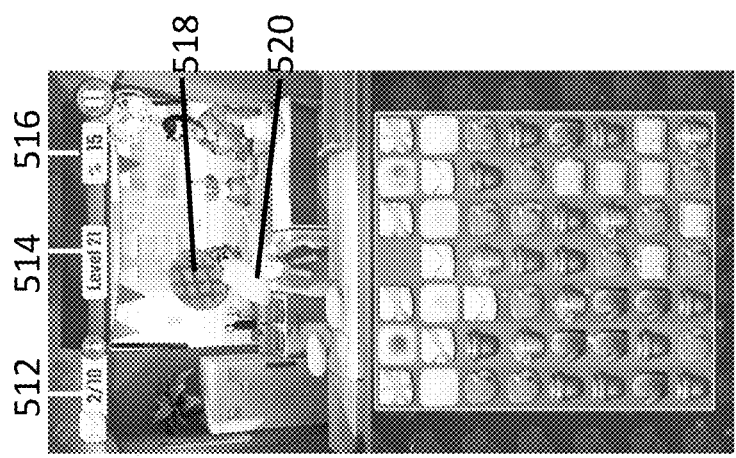
Figure 5A:
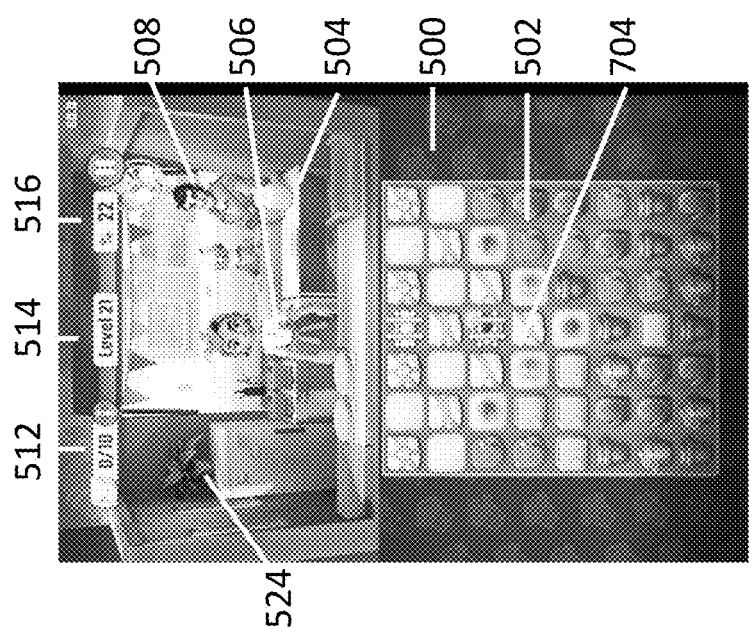

The at least one processor is configured to cause the display to display a user selectable area 708 or button. When the user selects via the user interface the user selectable area 708, the at least processor is configured to cause the display to display the screen shown in FIG. 5*a*. It should be appreciated that in some embodiments, the screen shown in FIG. 7 may be omitted and selection of the first selectable area 602 of FIG. 6 may result in the screen such as shown in FIG. 5*a* being directly displayed.

Thus, when a level is selected by user input received from the user via the user interface, the at least one processor is configured to cause a game area 500 to be displayed. FIGS.

5a to 5c show an example game area 500 which is displayed on the display at various stages during the playing of a level. The game area 500 has a first game area 502 and a second game area 504. The first game area 502 comprises a gameboard. In some embodiments, this game board may provide a game area for playing a match game of any of the types previously described. The example shown in FIGS. 5a to 5c is a match 3 switcher gameboard.

Matches made in the first game area 502 may allow objectives in the second game area 504 to be achieved. This will be described in more detail later.

The first game area 502 may be displayed below the second game area 504, above the second game area 504, to the left of the second game area 504 or to the right of the second game area 504. In some embodiments, the first game area may be at least partially provided in the second game area. In the example shown in FIGS. 5a to 5c, the first game area is displayed below the second game area.

As mentioned previously, some embodiments are provided in the context of a food truck. The second game area may thus be visualised as a food truck, as shown in FIGS. 5a to 5c. In the example shown in FIGS. 5a to 5c, the truck is a burger truck. Matches made in the first game area enable food items to be prepared and sold in the second game area. The second game area may visualised as the interior of a food truck in some embodiments. The second game area may include the visualization of one or more characters 506 who prepare the food items and/or one or more customers 508. The animation of the one or more characters and/or the one or more customers may be controlled responsive to game play on the game board.

In the example shown in FIGS. 5a to 5c, the aim is to collect the required number of the particular type of game object 704 in the first game area. This game object may in some embodiments be visualised as a grocery bag. Alternatively or additionally, the game object to be collected may be visualised as one or more food ingredients. The at least one processor is configured to cause the screen displayed in FIGS. 5a to 5c to indicate a total number of the particular game objects which need to be collected and the number of the particular game objects which have been collected so far. Thus as referenced 512, 10 of these game objects need to be collected and in FIG. 5a 0 of the game objects have been collected, in FIG. 5b, 2 of the game objects have been collected and in FIG. 5c, 5 of the game objects have been collected. The counter function may keep track of the number of game objects which are to be collected and/or the number of game objects which have been collected.

The game objects may be collected using any suitable mechanism. In some embodiments, the game object may be collected by making one or more matches at a location adjacent the game object to be collected. Alternatively or additionally, the game object may be collected by making a match including one or more of the game objects to be collected. Alternatively or additionally, the game object may be collected by the activation one or more so-called booster game objects.

A booster game object is one which provides an effect on the game board when triggered. For example, a booster game object may remove a row or column of game elements, remove one or more blocking game elements, remove one or more game elements, and change one or more game elements from one type of game element to another type of game element. It should be appreciated that these are some examples of booster game objects. Alternative or additional examples of booster game objects may be used in some embodiments.

In the example shown in FIGS. 5a to 5c, the food truck is a burger truck and is selling burgers. When a game object is collected, one or more components or ingredients for the item or burger are visualised as moving from the first game area to the second game area. For example, as shown in FIG. 5b, a required game object has been collected and the burger patty 518 and a slice of cheese 520 are shown in the second game areas. In some embodiments, the grocery bag is shown as moving to the second game area and on reaching the second game area, the ingredients are shown. In other embodiments, the ingredients are shown in the first game area when the grocery bag has been collected and are then shown moving to the second game area. The ingredients are then shown being assembled into the burger. It should be appreciated that in some embodiments, the one or more components or ingredients provided by one collected game object or grocery bag may not be sufficient to make a burger completely. Two or more of the grocery bags or game objects need to be collected to complete an item. It should be appreciated that in some embodiments, there may be one or more items which can be made using the ingredients or components provided by a single collected game object. In some embodiments, the at least one processor may be configured to cause the chef character to be animated to receive the one or more ingredients or components and start to make the recipe or item. In the case of a burger, for example, one or more burgers may start to be assembled.

Once an item or burger has been completed, using the ingredients or components provided by the one or more collected game objects, a complete burger item can be sold to a customer. As shown in FIG. 5c, a completed burger 522 is shown as being passed from the chef 506 to one of the customers 508. In this way, a player is provided with an experience which appears social.

In some embodiments, each time a burger or item is completed and sold to a customer, points and/or in game currency is earned. This is described in more detail later. It should be appreciated that the term points may encompass in game currency as well as any other type of points.

The at least one processor is configured to cause the screen which is displayed on the display and as shown in FIGS. 5a to 5c to indicate the level being played as referenced 514. In the example of FIGS. 5a to 5c, level 21 is being played. The at least one processor is configured to cause the screen which is displayed on the display and as shown in FIGS. 5a to 5c to indicate a number of moves remaining as referenced 516. In the example of FIG. 5a, there are 22 moves remaining, in FIG. 5b, there are 15 moves remaining and in FIG. 5c there are 2 moves remaining. Alternatively or additionally, the at least one processor may be configured to cause the display to display the number of moves which have been used up. The counter function may keep track of the number of moves remaining and/or the number of moves used up.

Some embodiments provide one or more levels. In some embodiments, there may be sets of levels. In some embodiments, a set of levels may be associated with a particular type of food truck. For example, the food truck may be a burger truck such as shown in FIGS. 5a to 5c.

Examples of food trucks may comprise one or more of the following food trucks: taco truck, pizza truck, sushi truck, bakery truck, pasta truck, BBQ truck, stir fry truck, smoothie truck, kebab tuck, paella truck, dim sum truck, ramen truck and seafood. Each food truck may be associated with one or more food items which are made from ingredients provided by collecting one or more collectable game objects. Different food trucks may make different items.

In some embodiments, when the food truck option 610 of FIG. 6 is selected, the at least one processor is configured to cause the display to display the screen shown in FIG. 12. As shown in FIG. 12, one food truck 1200 is currently available. In this example, the food truck 1200 is the burger truck. Two food trucks 1202 and 1204 are shown as currently unavailable. In this example, one of the food trucks 1202 is a pizza food truck and the other food truck 1204 is a sushi food truck. The list of food trucks may be scrollable. As shown in FIG. 12, a food truck which is available is shown with a different visual appearance to one which is not available. For example, a food truck which is unavailable may be displayed with a greyed out appearance. In some embodiments, the at least one processor may be configured to cause an available food truck to be selected in response to user input via the user interface. In some embodiments, the at least one processor may be configured to prevent an unavailable food truck from being selected by the user until it is unlocked.

As discussed previously, in some embodiments, one or more options may be provided to upgrade the food truck. When the food truck upgrade option 606 is selected by user input received via the user interface, the at least one processor causes the screen shown in FIG. 8 to be displayed on the display. As can be seen from FIG. 8, the screen shows a list of a number of options to upgrade the food truck. The first option 800 is to update the fryer, the second option 802 is to add a plant, a third option 804 is to decorate the food truck, a fourth option 806 is to add hot sauce, and a fifth option 808 is to upgrade a knife. Each option is associated with a user selectable area 810. The user selectable area may provide information as to the amount of in game currency or points required for the respective upgrade option. (This is earned as previously described). When a respective upgrade option is selected by user input received via the user interface, the at least one processor is configured to cause the food truck to be upgraded. This will require the associated amount of in game currency or points to be used up. The at least one processor may be configured to cause the associated number of points or in game currency to be decremented from a total amount of points or in game currency which has been accumulated by the user. In some embodiments, the counter function may be used to keep track of the number of points or in game currency which the user has.

Figure 8:
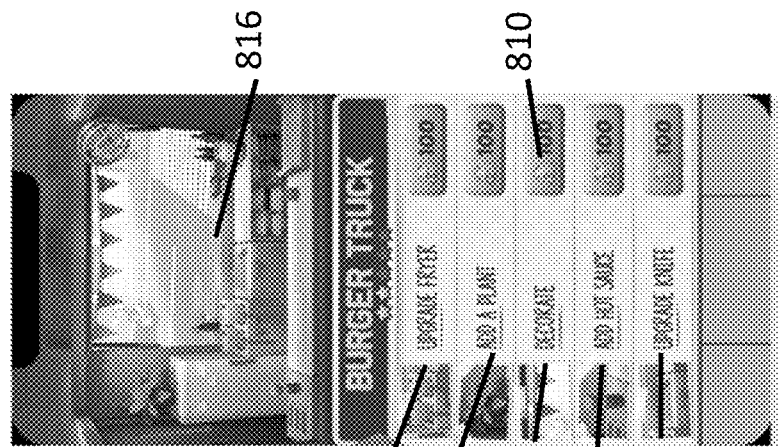
FIG. 8 shows an example screen displayed when a food truck upgrade option of FIG. 6 is selected.

It should be appreciated that the options shown in FIG. 8 are by way of example and one or more other upgrade options may alternatively or additionally be provided.

In the example shown in FIG. 8, the at least one processor is configured to cause the display to display the current interior 816 or kitchen of the truck.

In some embodiments, the options which are available to a user may depend on the level which the user has reached in the game. For example, as the user completes more levels, more options may be available to a user. One or more options may be associated with one or more specific levels. Alternatively or additionally, the upgrades may be divided into progressive sets of upgrades. All the upgrades in one set of upgrades may need to be completed before the user is offered one or more of the upgrades of the next set of upgrades.

In some embodiments, the at least one processor is configured to control the display such that only those options which are currently selectable by the user are displayed on the display. In other embodiments, those upgrade options which are unavailable to the user may be displayed but are locked. In other words, a locked option is not selectable by the user.

In some embodiments, there may be one or more options which are not yet available to the user. This may be due to the player having insufficient in game currency or points and/or may be an option which requires one or more other upgrades to be first completed. The options which are unavailable options are either not displayed or are displayed but are locked. A locked option is not selected by user input received via the user interface.

In some embodiments a food truck may have a basic appearance initially and can be upgraded as various options to upgrade the truck are selected. In the following references to upgrades to the truck are upgrades to the image of the truck. The image of the truck may be regarded as an upgradable image. This may be dependent on the level of the game or may be independent of the level of the game. As the food truck is upgraded, different parts of the truck may be upgraded. FIG. 10*a* shows one example of a truck 1000 (on the left) which has yet to be upgraded and the same truck (on the right) which has had several upgrades.

The upgrades may improve the exterior appearance of the truck. For example the upgraded truck is provided with a blackboard 1002, a logo 1004, a light 1006, a canopy 1008, a burger sign 1010 on top of the truck and a drinks cooler 1012. It should be appreciated that these are by way of example only and other embodiments may alternatively or additionally have one or more alternative and/or additional upgrade options which can be applied to the exterior of the truck.

The upgrades may alternatively or additionally improve the appearance of the kitchen or interior of the food truck. As can be seen from FIGS. 5*a* to 5*c*, the kitchen of the food truck is displayed in the second game area. In some embodiments, any upgrade which is made to the kitchen of the food truck will be displayed in the second game area. Accordingly, as can be seen from FIG. 5*a*, there is a plant 524 which is provided in the kitchen of the food truck as a result of the add a plant option being selected. Thus the upgrades which are made to the kitchen of truck via the truck upgrade screen are reflected in the image of the kitchen of the truck displayed in the second game area such as shown in FIGS. 5*a* to 5*c*.

Figure 10C:
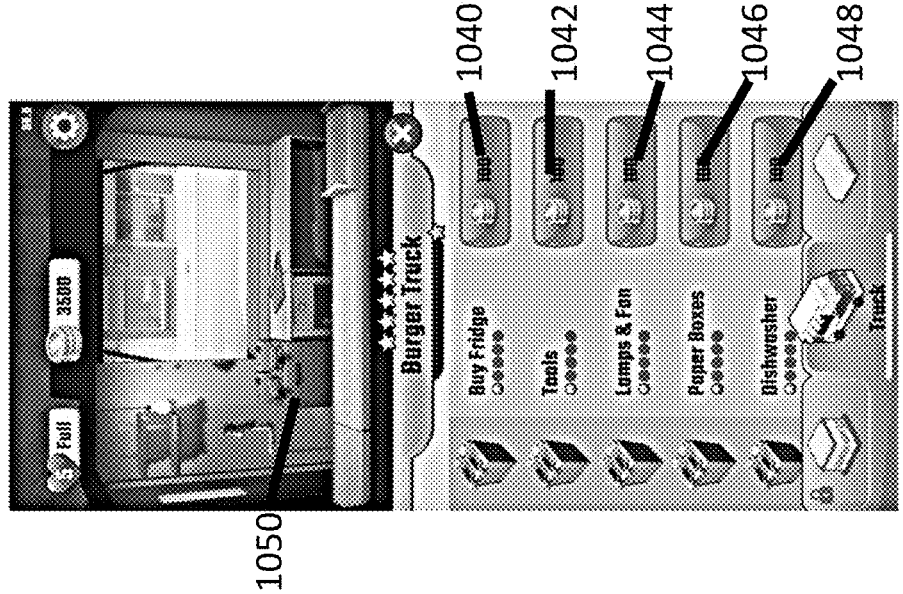
FIGS. 10*b* and 10*c* show some further example screens displayed when a food truck upgrade option is selected.
Figure 10B:
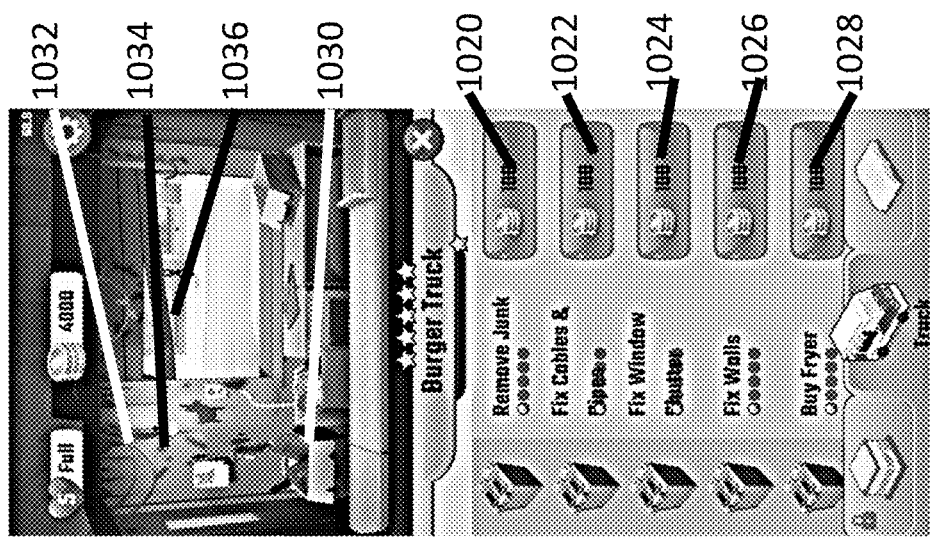
Figure 10D:
FIG. 10*d* shows a kitchen of the food truck after the upgrade options of FIG. 10*c* have been selected and applied.

Reference is made to FIGS. 10*b* to 10*d* which shows another example where the appearance of the kitchen of the food truck changes as a series of upgrades are performed. The appearance of the kitchen shown in FIG. 10*b* may be the appearance of the kitchen without any upgrades and is displayed in conjunction with the various upgrade options. It should be emphasised that the appearance of the kitchen shown in FIGS. 10*b* to *d* is also used when playing a level such as shown in relation to FIGS. 5*a* to 5*c*.

Referring first to FIG. 10*b*, the at least one processor is configured to cause the display to display the following options which are selectable by the user:

Remove junk 1020—as can be seen from a comparison of FIG. 10*b* with FIG. 10*c*, this clears junk 1030 from the kitchen when selected;

Fix cables and pipes 1022—as can be seen from a comparison of FIG. 10*b* with FIG. 10*c*, this fixes the cables and pipes 1032 in the kitchen when selected Fix window 1024—as can be seen from a comparison of FIG. 10*b* with FIG. 10*c*, this fixes the window 1036 in the kitchen when selected Buy fryer 1026—as can be seen from a comparison of FIG. 10*b* with FIG. 10*c*, this installs a fryer 1050 in the kitchen when selected.

The appearance of the kitchen shown in FIG. 10*c* may be the appearance of the kitchen after the upgrades of FIG. 10*b* have all been selected and applied. Again the appearance of the kitchen is shown in conjunction with the various upgrade options.

Referring to FIG. 10c, the at least one processor is configured to cause the display to display the following options which are selectable by the user:

Buy fridge 1040—as can be seen from a comparison of FIG. 10c with FIG. 10d, this installs a fridge 1060 in the kitchen when selected;

Tools 1042—as can be seen from a comparison of FIG. 10c with FIG. 10d, this puts up utensils 1062 in the kitchen when selected;

Lamps and Fan 1044—as can be seen from a comparison of FIG. 10c with FIG. 10d, this sets up lights and fan 1064 in the kitchen when selected;

Paper boxes 1046—as can be seen from a comparison of FIG. 10c with FIG. 10d, this stocks takeout boxes 1066 in the kitchen when selected;

Dishwasher 1048—as can be seen from a comparison of FIG. 10c with FIG. 10d, this installs a dishwasher 1068 in the kitchen when selected.

FIG. 10d shows just the appearance of the kitchen after the upgrades of FIG. 10c have been selected and applied. This image of the kitchen shown in FIG. 10d will be used when the game level is next played and/or when a truck upgrade menu is next selected.

It should be appreciated that when an option is selected by the user, this will use up a given amount of in game currency or points. If the user does not have sufficient in game currency or points, the user will not be able to select that option. In the examples shown in FIGS. 10b to 10d, each of the upgrade options is associated with the same amount of in game currency or points. Alternatively or additionally some options may be associated with different amounts of in game currency or points.

In the above, all the upgrade options have been selected. Of course the user may select one, some, all or even none of the options from the truck upgrade menu.

In some embodiments, when the upgrade options have been selected and completed, the at least one processor is configured to cause a screen such as shown in FIG. 6 to be displayed on the display. The at least one processor may configured to cause the screen of FIG. 6 to be displayed with an image of the truck prior to the selected upgrades. The at least one processor is then configured to cause the screen of FIG. 6 to be updated to show an image of the truck after the selected upgrades have been applied.

Alternatively the at least one processor may be configured to cause the screen of FIG. 6 just to show the image of the food truck after the upgrades have been applied.

It should be appreciated that the visualisation of the second area as a food truck is by way of example only and other embodiment may be visualised in any other suitable setting such as a room, a building, an outside setting, a vehicle, a spaceship, a bus, a ship, a restaurant and or the like.

The second area can be regarded as an item producing area and can be visualised in any suitable way. Likewise the item to be produced may be visualised in any suitable way.

As shown in FIG. 8, one of the options for an upgrade is a "hot sauce" option. The "hot sauce" option in a way in which a booster option is visualised but in other embodiments, this option may be visualised in any other suitable way. This provides a way in which a booster can be earned via game play on the game board and provided on the game board.

Figure 11:
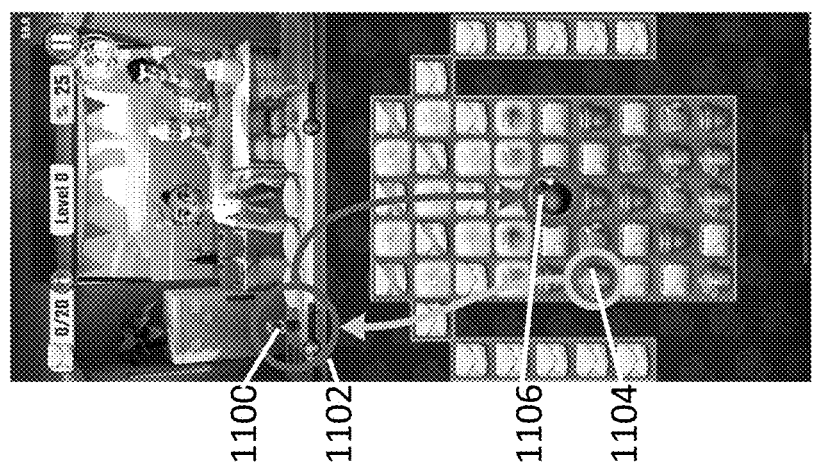
FIG. 11 shows an upgrade option of the food truck applied during playing of a level.

Thus when the at least one processor causes the display to display the list of upgrade options, the hot sauce may be one of the displayed options. The hot sauce 1100 is shown in FIG. 11 and is provided in the kitchen of the truck. The hot sauce 1100 is activated by collecting one or more specific types of game element 1104 during game play. For example, game elements of a particular colour or shape may be collected. A game element is collected by removing it from the game board. The game element may be removed by being part of match or as a result of a booster being triggered. In some embodiments, n game elements may need to be collected in order to trigger the hot sauce of the kitchen.

In some embodiments, the at least one processer is configured to cause the display to provide information as to the type of game elements which need to be collected. This may be by displaying the hot sauce in the same colour as the game elements which are to be collected or otherwise conveyed. In some embodiments, the at least one processer is configured to cause the display to provide information to indicate the progress made by the user in collecting the game elements required to trigger the booster. In the example shown in FIG. 11, this is conveyed by means of a progress bar 1102. The counter function may be used to keep track of the number of required game elements which have been collected and/or the number of required game elements to be collected.

In some embodiments, when the hot sauce is triggered, one or more booster game objects 1106 are added to the game board in the first area.

In some embodiments, the hot sauce can be triggered more than once in a game. Once the hot sauce is triggered, provided that the player collects another n game elements, the hot sauce can be triggered again.

In some embodiments, one or more upgrades may be made to the hot sauce. An upgraded hot sauce may be triggered after a fewer number of game elements are collected and/or may provide a more powerful booster and/or may provide more boosters.

In some embodiments, the upgrades may allow the user to collect one or more additional hot sauces. Each hot sauce may be associated with a different booster. Each hot sauce may be associated with different types of game elements.

As mentioned earlier, when the recipe menu option 608 is selected, the at least one processor is configured to cause the display to display the screens shown in FIGS. 9a and 9b. As the food truck is a burger truck, in this example the recipes are for burgers. In the example shown in FIGS. 9a and 9b, the menu is a scrollable menu with FIG. 9a showing one part of the menu and FIG. 9b showing a different part of the menu.

Every food truck may start with one or more basic recipes. When playing a level, the game logic (customers) may pick a combination of these recipes (type and amount) to be cooked during the playing of the level. In other embodiments, the customers may be provided by other players.

For every time a recipe is cooked (that is an item is provided), the player receives a base points value. These points can be regarded as providing an in-game currency. These points may be received even if the level is lost. As the player repeats the recipe, the points provided by completing that recipe increases up to a maximum number of points for that recipe. These are the same points or in game currency which are used to provide the truck upgrades, in some embodiments.

Thus as shown in FIGS. 9a and 9b, for each recipe 900 which is currently selectable by the at least one processor, information 902 is provided as to the subject of the recipe. For example the recipe may be for a cheeseburger or a vegan black bean burger. A visual representation 904 of the subject of the recipe is displayed. Information 906 is provided as to the current points associated with the recipe. If the item associated with the recipe is completed by the player while playing the level, the indicated number of points is acquired by the player.

Information is provided about the progress the player is making to master the recipe (and hence maximise the number of points or in game currency received for making the item associated with the recipe). Each time the player completes the recipe, progress is made towards mastering the recipe. In the example shown in FIGS. 9a and 9b, this information 9010 is provided by an indication of an achieved number of stars. For example, when a player has mastered a recipe, they will receive a maximum number of stars. In this example, the maximum number of stars is 5.

In some embodiments, a progress bar 912 or the like is shown in order to show the progress that the player is making towards getting the next star. As the player gets more stars, the player will receive more points each time the item is made.

For example as shown in FIG. 9a, the player has mastered the cheeseburger by preparing it a required number of times and now receives 6 points when the cheeseburger is provided during the playing of a level. The cheeseburger is associated with 5 stars.

In contrast the crispy chicken burger has not yet been mastered, having one star. The chicken burger now provides 2 points when the chicken burger is provided during the playing of a level.

In some embodiments, an aim is to reveal recipes in a cook bock. A recipe is fully revealed when the recipe has been mastered. In some embodiments, each time the user obtains a star, another part of the recipe is revealed.

As shown in FIG. 9b, there may be one or more recipes 918 which are yet to be unlocked. The at least one processor is configured to cause a locked recipe to be displayed in such a way as to indicate to the user that the recipe is locked. The player may need to upgrade the truck to a given level and/or reach a given game level in order to unlock a particular recipe.

In some embodiments, completing game levels earns in-game currency and also earns recipe points which contributes to the mastering of a recipe such as described in relation to FIGS. 9a and 9b. When enough recipe points have been earned, the star rating of the recipe can be upgraded up until the maximum star rating. The in-game currency can be used to upgrade the food truck. When the food truck is upgraded to a next truck level, a set of one or more recipes in unlocked.

Figure 13:
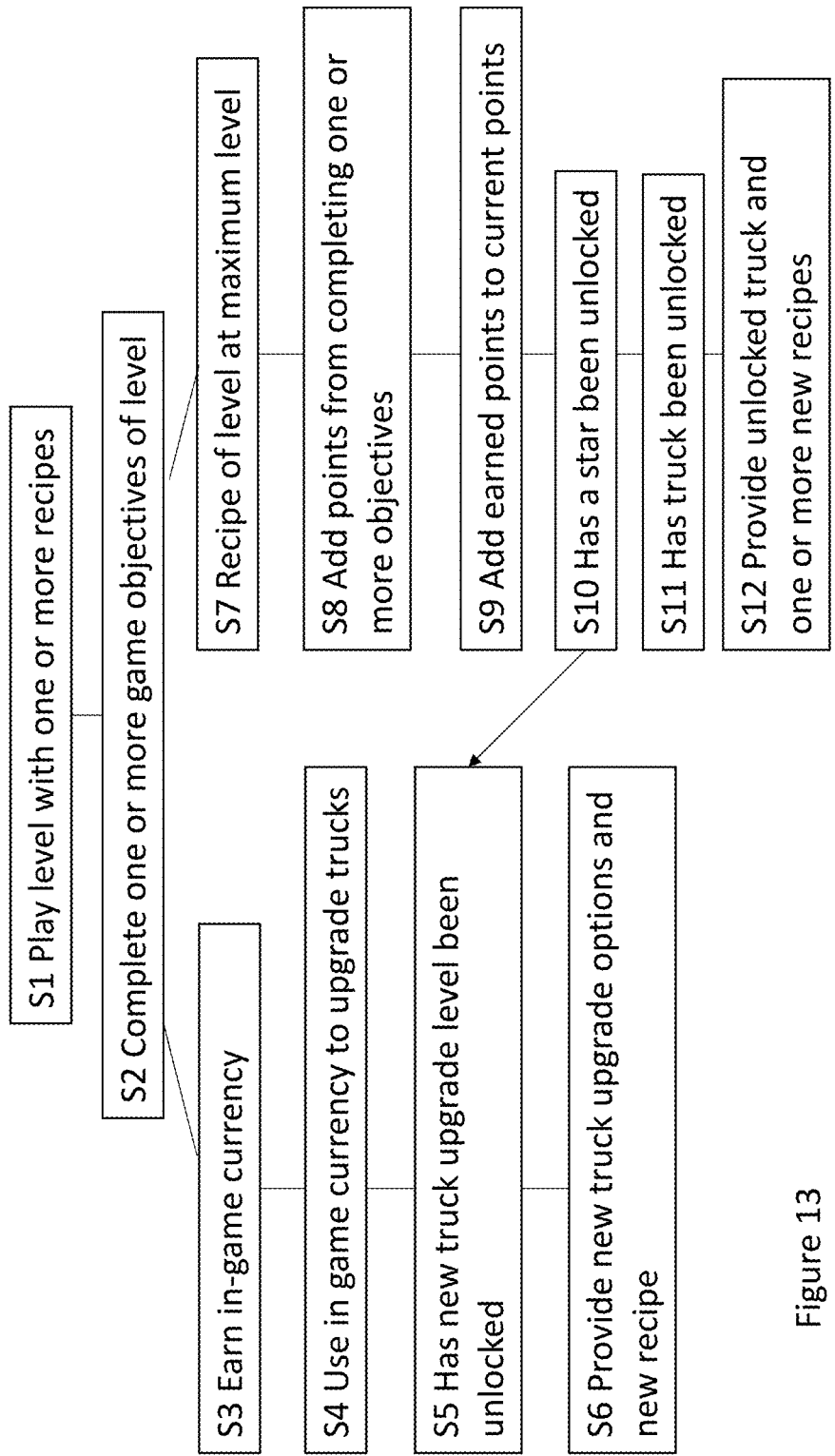
FIG. 13 shows a method of some embodiments.

Reference is made to FIG. 13 which shows a schematic flow of some embodiments.

As referenced S1, the at least one processor controls the user device to allow a user to play a level with one or more objectives. In the example of some embodiments, the objective may be to provide one or more items by completing one or more recipes. For example, the player may need to make n food items. In the example discussed in relation to FIG. 7, two burgers need to be made.

As referenced S2, the at least one processor is configured to determine that the player has completed one or more of the objectives associated with a game level. Thus one or more of the items have been provided a result of game play.

As referenced S3, the at least one processor is configured to determine the completion of one or more game objectives and to determine the amount of in game currency or points earned. In the context of the example game previously discussed, each food item (e.g. burger) is sold to a customer to earn the in game currency or points and each recipe is associated with a given number of points or in game currency.

As referenced S4, the at least one processor may be configured to allow the user to upgrade an upgradable image—that is to upgrade the truck image such as described previously. The at least one processor is configured to cause the respective amount of in game currency or points associated with one or more of the selected options to be used up. In this way, the user is able to upgrade the truck image such as previously described.

As referenced S5, the at least one processor may be configured to determine if the truck image has been upgraded to a next level.

As referenced S6, in response to determining that the truck image has been upgraded to the next level, the at least one processor may be configured to provide one or more new recipes and/or one or more new upgrade options for the truck image and/or one or more new trucks.

The following are performed after S2. There may be at least a partially overlap of one or more of steps S3 to S6 with one or more of steps S7 to S12.

As referenced S7, the at least one processor may be configured to determine if the recipe associated with the food item has been mastered or has the maximum number of stars.

As referenced S8, where the recipe is not yet mastered, the at least one processor is configured to add points earned from providing each item (e.g. for each burger) to the current points total for the recipe.

As referenced S9, the at least one processor may be configured to determine if the next level (star) of the recipe has been reached.

As referenced S10, if it is determined that the recipe has reached the next level, the at least one processor may be configured to determine if one or more new recipes and/or more new trucks are to be provided.

As referenced S11, if the at least one processor determines that one or more new recipes and/or one or more new trucks are to be provided, the one or new recipes and/or one or more new trucks are available in the computer implemented game.

In some embodiments, when a recipe is mastered, that may provide the player with one or more items which can be used to upgrade the truck image. For example, mastering a recipe could provide a fridge for the food truck.

In some embodiments, unlocking of recipes and/or the mastering of recipes may allow one or more truck image upgrade options to be made available. In some embodiments, unlocking of recipes and/or the mastering of recipes may allow one or more new food trucks to be made available.

In the above described embodiments, game objects are collected on a game board to provide components which are used to provide items in a second area of the game board which has an upgradable image. In the described embodiments, the game objects are visualized as grocery bags. In other embodiments, the game objects may be visualised in any other suitable way. In some embodiments, one or more of the game objects to be collected may be visualised as one or more of the components. In the described embodiments, the components are ingredients. In other embodiments, the components may be visualized differently. In some embodiments, the item to be made may be a food items. In other embodiments, the items may be visualised differently. In some embodiments, the items are provided in a second area of the display which is capable of being visually upgraded. The second area of the display is visualized in some embodiments as a food truck but in other embodiments, the second area may be visualised in any other suitable way. In some embodiments, the items may be directly or indirectly associated with different levels (e.g. different levels of mastering of a recipe).

Figure 4:
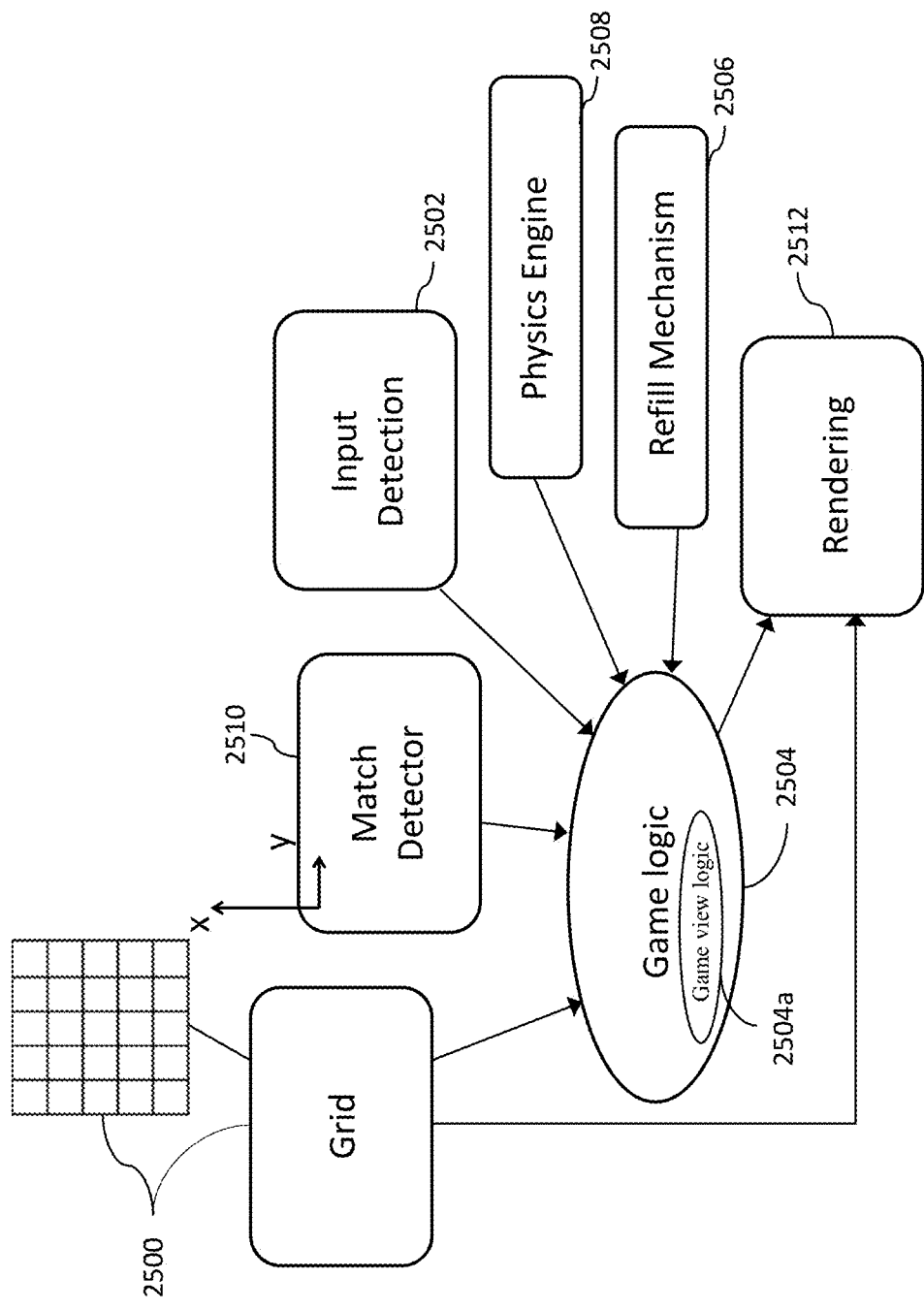
FIG. 4 shows a view of the functional components of the game.

FIG. 4 shows a schematic representation of the functional blocks of an embodiment used to enable game play, such as that discussed above. Input detection 2502 captures the user input and feeds the input to the game logic 2504. The user input can be provided via any suitable user input device, such as those described above. In the context of the game, this user input can be used in a game view to indicate which game objects have been selected by a user, and thus to indicate the blocks to be removed. The game logic 2504 will process the information provided by the user input. The game logic 2504 may then determine if a valid selection has been made, and what the outcomes of the selection should be. The game logic may determine if any of the objects to be collected have been collected.

The game logic comprises game view logic 2504*a*, that is game logic associated with playing levels.

The rendering block is used to render the game board to the user. It is also used to render the view of the food truck image in dependence on its current upgrade information.

Reference is made to FIG. 14 which shows a method of some embodiments. The method may be performed by a computer device. The computer device may be configured to provide a computer implemented game.

As referenced T1, the method comprises causing, by the at least one processor, the display to display for a respective level of the computer implemented game a game play screen. The game play screen comprises a game board in a first area of game play screen and an upgradable image in a second area of the game play screen. The game board comprises one or more first game objects to be collected in response to user interaction via the user interface with the game board to play the respective level.

As referenced T2, the method comprises causing, by the at least one processor in response to collecting of one or more first game objects, one or more items to be provided in the second area of the display. The items are to satisfy one or more game objectives associated with the second area of the game play screen.

As referenced T3, the method comprises causing, by the at least one processor, the display to display an image upgrade screen, different to the game play screen. The image upgrade screen has one or more options for upgrading the upgradable image.

As referenced T4, in response to user input received via the user interface selecting one or more of the options for upgrading the upgradable image, the method comprises providing by the at least one processor a first upgraded image. When a respective level of the computer implemented game is played, the first upgraded image is displayed in the second area of the respective game play screen.

A grid component 2500 stored in a memory provides a grid representation of the game board as shown schematically in FIG. 4. The grid component can be supplied by any suitable data structure, held in a local memory or remote memory accessible by the device, and is responsible for identifying each tile location on the game board and thus providing a tile ID with which to associate information about the game element displayed at that tile location. This associated information may then be used in combination with other components in order to control the rendering of the display, e.g. the match detector component 2510, and the refill mechanism component 2506.

Each game element has object data associated therewith. The object data may be stored in any suitable memory location. In some embodiments, the object data may be provided by a data structure. In some embodiments, the object data may be considered to be part of the game logic and in other embodiments may be considered to be outside the game logic. The object data may provide information as to the properties of a game element or block. These properties can include attribute information such as colour and/or whether or not a game element has a particular function such as a booster function and/or if the game element is a particular game element to be collected.

The game logic 2504 will determine the blocks selected by a user, and the actions to follow to implement the game mechanic.

Thus, the game logic controls the rules for determining if a valid group has been selected. The game logic will have access to data for each tile including its tile ID designating its location on the grid 2500, and associated tile data providing information about the contents of that tile, e.g. the game element within that tile or at least one characteristic associated with the game element within the tile. The game logic will thus be able to determine the game elements to be removed from those respective tiles for each user selection. The grid can be considered as a map which may be used to determining the relative positions of tiles on the game board from the tile ID. In embodiments, the grid 2500 is implemented as a two-dimensional grid. By splitting the grid 2500 into row or column sets of tiles, each with their own deterministic game element generating algorithm, the game board may be simplified to a set of one-dimensional sub-grids. The grid 2500 is shown with two dimensions, x and y. However, any alpha numerical designation can be used as the tile ID. No logical relationship between tile IDs is required. However, the grid position relationship between tile IDs may be determinable from the tile ID alone, e.g. by using an array of tiles with numbered rows and lettered columns. The position of a game element may be either where the game element is or where the game element is going (e.g. the endpoint of a game element moving due to a refill).

Once a group of blocks has been successfully selected, these blocks may be removed and the respective tiles will become empty. At this stage, a refill of the empty tiles is required based on the refill mechanism 2506. The refill mechanism may also have conditions on which it relies. For example, other moves or actions taking place on the game board may have to be completed before the refill mechanism can take place.

Each tile of the grid 2500 may be associated with data to indicate a status such as filled or unfilled (empty). Thus, when the game board is refilled, each tile of the grid may be checked for such a status. Upon determining that there are tiles which are empty, the need to refill these tiles is recognised. Boolean logic may be used to determine whether a tile is to be refilled using the filled status of the tiles of the grid. The tiles must satisfy the condition of being unfilled in order to be refilled. As part of the refill mechanism, empty tiles are designated as the endpoint for particular blocks. This may be as the endpoint of a block which is already in the game board and moving as a result of a game move due to the action of the physics engine 2508, or as the endpoint of a new block entering the game board. The physics engine component 2508 is configured to control the movement of moving game elements in the display. The physics engine 2508 may be part of the game logic 2504.

A filled tile will be treated by the game logic as a solid entity, preventing any other game objects from passing through this particular tile. By filled tile it is meant that the tile is occupied by a game element, e.g. a block, a booster etc. In this way, the game logic may also force the refill mechanism to conform to certain refill trajectories or paths. That is to say new or moving game elements will not be able to pass through or refill through filled tiles. It should be appreciated that the terms pass through and refill through are dependent on the specific game rules, e.g. some game boards may refill from a direction perpendicular to the plane of the game board.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

An appropriately adapted computer program code product or products may be used for implementing the embodiments, when loaded on an appropriate data processing apparatus, and/or other control operations. The program code product for providing the operation may be stored on, provided, and embodied by means of an appropriate carrier medium. An appropriate computer program can be embodied on a computer readable record medium. A possibility is to download the program code product via a data network. In general, the various embodiments may be implemented in hardware or special purpose circuits, software, logic, or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

The person skilled in the art will realise that the different approaches to implementing the methods and control module are not exhaustive, and what is described herein are certain embodiments. It is possible to implement the above in a number of variations without departing from the spirit or scope of the invention.

The invention claimed is:

1. A computer device configured to provide a computer implemented game, the computer device comprising a display, a user interface, at least one memory, and at least one processor wherein:
    the at least one processor is configured to cause the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;
    the at least one processor is configured, in response to collecting of one or more first game objects, cause one or more items to be provided in the second area of the display, the items being to satisfy one or more game objectives associated with the second area of the game play screen;
    the at least one processor is configured to cause the display to display an image upgrade screen, different to the game play screen, the image upgrade screen having one or more options for upgrading the upgradable image; and
    the at least one processor is configured in response to user input received via the user interface selecting one or more of the options for upgrading the upgradable image to provide a first upgraded image, wherein when a respective level of the computer implemented game is played, the first upgraded image is displayed in the second area of the respective game play screen,
    wherein at least one upgrade option associated with the upgradeable image provides a booster triggering option in a respective level of the computer implemented game.

2. The computer device as claimed in claim 1, wherein the at least one processor is configured to cause the at least one booster triggering option to be triggered in response to one or more criteria being satisfied by gameplay associated with the gameboard.

3. The computer device as claimed in claim 2, the at least one processor is configured to cause one or more boosters to be provided on the game board in response to determining that the one or more criteria have been satisfied.

4. The computer device as claimed in claim 1, wherein the at least one processor is configured to cause the display to display a current appearance of the upgradable image on the image upgrade screen.

5. The computer device as claimed in claim 1, wherein the upgradable image displayed in the second area of the game play screen is of a food truck.

6. The computer device as claimed in claim 1, wherein the upgradeable image displayed in the second area of the game play screen is of an interior of a food truck.

7. The computer device as claimed in claim 6, wherein the at least one processor is configured to provide one or more options in the image upgrade screen for upgrading the interior of the food truck and one or more options for upgrading an exterior of the food truck.

8. The computer device as claimed in claim 7, wherein a respective option for upgrading the upgradeable image is associated with a respective number of points, the at least one processor being configured to cause the respective number of points to be used when the respective option is selected.

9. The computer device as claimed in claim 1, wherein the at least one processor is configured to provide one or more points in response to each of the one or more items being provided in the second area of the display.

10. The computer device as claimed in claim 9, wherein one or more of the items are associated with a recipe.

11. The computer device as claimed in claim 9, wherein one or more of the items is associated with a plurality of levels, the level of a respective item determining a number of points provided by the respective item.

12. The computer device as claimed in claim 11, wherein the at least one processor is configured, in response to the providing of the respective item, to cause the associated number of points for the respective item to be used to progress to or towards a next level of the respective item.

13. The computer device as claimed in claim 12, wherein the at least one processor is configured when a respective item has reached a maximum level to cause one or more levels associated with the upgradable image to become available.

14. The computer device as claimed in claim 1, wherein the upgradable image comprises a plurality of levels.

15. The computer device as claimed in claim 14, wherein the at least one processor is configured such that one or more different ones of the items can only be provided when the upgradable image has reached a respective level.

16. The computer device as claimed in claim 1, wherein the at least one processor is configured to select one of a plurality of different upgradable images to be displayed in the second area of the game play screen, different ones of the upgradable images being associated with different items.

17. The computer device as claimed in claim 1, wherein the at least one processor is configured to cause the display to display in the second area, one or more components related to the items to be provided.

18. The computer device as claimed in claim 1, wherein the at least one processor is configured to determine that a first game object is collected in response to determining that a move made by a user via the user interface causes a match to be made on the game board adjacent a respective first game object.

19. The computer device as claimed in claim 1, wherein the at least one processor is configured to determine that a first game object is collected in response to determining that a move made by a user via the user interface causes a booster game object to be triggered, the triggering of the booster object causing the first game object to be collected.

20. A computer method providing a computer implemented game, the method being provided by a computer device configured to provide the computer implemented game and comprising a display, a user interface, at least one memory, and at least one processor, the method comprising:
  causing, by the at least one processor, the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;
  causing, by the at least one processor in response to collecting of one or more first game objects, one or more items to be provided in the second area of the display, the items being to satisfy one or more game objectives associated with the second area of the game play screen;
  causing, by the at least one processor, the display to display an image upgrade screen, different to the game play screen, the image upgrade screen having one or more options for upgrading the upgradable image; and
  in response to user input received via the user interface selecting one or more of the options for upgrading the upgradable image, providing by the at least one processor a first upgraded image, wherein when a respective level of the computer implemented game is played, the first upgraded image is displayed in the second area of the respective game play screen,
  wherein at least one upgrade option associated with the upgradeable image provides a booster triggering option in a respective level of the computer implemented game.

21. A computer program product stored in a non-transitory computer-readable medium, the computer program product comprising instructions which, when implemented by the at least one processor, cause a computer device to be configured to provide a computer implemented game, the at least one processor being configured to:
  cause a display of the computer device to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;
  cause, in response to collecting of one or more first game objects, one or more items to be provided in the second area of the display, the items being to satisfy one or more game objectives associated with the second area of the game play screen;
  cause the display to display an image upgrade screen, different to the game play screen, the image upgrade screen having one or more options for upgrading the upgradable image; and
  in response to user input received via the user interface selecting one or more of the options for upgrading the upgradable image, providing a first upgraded image, wherein when a respective level of the computer implemented game is played, the first upgraded image is displayed in the second area of the respective game play screen, wherein at least one upgrade option associated with the upgradeable image provides a booster triggering option in a respective level of the computer implemented game.

22. A computer device configured to provide a computer implemented game, the computer device comprising a display, a user interface, at least one memory, and at least one processor wherein:

the at least one processor is configured to cause the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

the at least one processor is configured, in response to collecting of one or more first game objects, cause one or more items to be provided in the second area of the display, the items being to satisfy one or more game objectives associated with the second area of the game play screen;

the at least one processor is configured to cause the display to display an image upgrade screen, different to the game play screen, the image upgrade screen having one or more options for upgrading the upgradable image; and the at least one processor is configured in response to user input received via the user interface selecting one or more of the options for upgrading the upgradable image to provide a first upgraded image, wherein when a respective level of the computer implemented game is played, the first upgraded image is displayed in the second area of the respective game play screen, wherein the upgradable image displayed in the second area of the game play screen is of a food truck.

23. A computer method providing a computer implemented game, the method being provided by a computer device configured to provide the computer implemented game and comprising a display, a user interface, at least one memory, and at least one processor, the method comprising:

causing, by the at least one processor, the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

causing, by the at least one processor in response to collecting of one or more first game objects, one or more items to be provided in the second area of the display, the items being to satisfy one or more game objectives associated with the second area of the game play screen;

causing, by the at least one processor, the display to display an image upgrade screen, different to the game play screen, the image upgrade screen having one or more options for upgrading the upgradable image; and in response to user input received via the user interface selecting one or more of the options for upgrading the upgradable image, providing by the at least one processor a first upgraded image, wherein when a respective level of the computer implemented game is played, the first upgraded image is displayed in the second area of the respective game play screen, wherein the upgradable image displayed in the second area of the game play screen is of a food truck.

24. A computer program product stored in a non-transitory computer-readable medium, the computer program product comprising instructions which, when implemented by the at least one processor, cause a computer device to be configured to provide a computer implemented game, the at least one processor being configured to:

cause a display of the computer device to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

cause, in response to collecting of one or more first game objects, one or more items to be provided in the second area of the display, the items being to satisfy one or more game objectives associated with the second area of the game play screen;

cause the display to display an image upgrade screen, different to the game play screen, the image upgrade screen having one or more options for upgrading the upgradable image; and in response to user input received via the user interface selecting one or more of the options for upgrading the upgradable image, providing a first upgraded image, wherein when a respective level of the computer implemented game is played, the first upgraded image is displayed in the second area of the respective game play screen, wherein the upgradable image displayed in the second area of the game play screen is of a food truck.

25. A computer device configured to provide a computer implemented game, the computer device comprising a display, a user interface, at least one memory, and at least one processor wherein:

the at least one processor is configured to cause the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

the at least one processor is configured, in response to collecting of one or more first game objects, cause one or more items to be provided in the second area of the display, the items being to satisfy one or more game objectives associated with the second area of the game play screen;

the at least one processor is configured to cause the display to display an image upgrade screen, different to the game play screen, the image upgrade screen having one or more options for upgrading the upgradable image; and the at least one processor is configured in response to user input received via the user interface selecting one or more of the options for upgrading the upgradable image to provide a first upgraded image, wherein when a respective level of the computer implemented game is played, the first upgraded image is displayed in the second area of the respective game play screen, wherein the upgradable image displayed in the second area of the game play screen is of an interior of a food truck.

26. A computer method providing a computer implemented game, the method being provided by a computer device configured to provide the computer implemented game and comprising a display, a user interface, at least one memory, and at least one processor, the method comprising:

causing, by the at least one processor, the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

causing, by the at least one processor in response to collecting of one or more first game objects, one or more items to be provided in the second area of the display, the items being to satisfy one or more game objectives associated with the second area of the game play screen;

causing, by the at least one processor, the display to display an image upgrade screen, different to the game play screen, the image upgrade screen having one or more options for upgrading the upgradable image; and in response to user input received via the user interface selecting one or more of the options for upgrading the upgradable image, providing by the at least one processor a first upgraded image, wherein when a respective level of the computer implemented game is played, the first upgraded image is displayed in the second area of the respective game play screen, wherein the upgradable image displayed in the second area of the game play screen is of an interior of a food truck.

27. A computer program product stored in a non-transitory computer-readable medium, the computer program product comprising instructions which, when implemented by the at least one processor, cause a computer device to be configured to provide a computer implemented game, the at least one processor being configured to:

cause a display of the computer device to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

cause, in response to collecting of one or more first game objects, one or more items to be provided in the second area of the display, the items being to satisfy one or more game objectives associated with the second area of the game play screen;

cause the display to display an image upgrade screen, different to the game play screen, the image upgrade screen having one or more options for upgrading the upgradable image; and in response to user input received via the user interface selecting one or more of the options for upgrading the upgradable image, providing a first upgraded image, wherein when a respective level of the computer implemented game is played, the first upgraded image is displayed in the second area of the respective game play screen, wherein the upgradable image displayed in the second area of the game play screen is of an interior of a food truck.

28. A computer device configured to provide a computer implemented game, the computer device comprising a display, a user interface, at least one memory, and at least one processor wherein:

the at least one processor is configured to cause the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

the at least one processor is configured, in response to collecting of one or more first game objects, cause one or more items to be provided in the second area of the display, the items being to satisfy one or more game objectives associated with the second area of the game play screen;

the at least one processor is configured to cause the display to display an image upgrade screen, different to the game play screen, the image upgrade screen having one or more options for upgrading the upgradable image; and the at least one processor is configured in response to user input received via the user interface selecting one or more of the options for upgrading the upgradable image to provide a first upgraded image, wherein when a respective level of the computer implemented game is played, the first upgraded image is displayed in the second area of the respective game play screen, wherein one or more of the items are associated with a recipe.

29. A computer method providing a computer implemented game, the method being provided by a computer device configured to provide the computer implemented game and comprising a display, a user interface, at least one memory, and at least one processor, the method comprising:

causing, by the at least one processor, the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

causing, by the at least one processor in response to collecting of one or more first game objects, one or more items to be provided in the second area of the display, the items being to satisfy one or more game objectives associated with the second area of the game play screen;

causing, by the at least one processor, the display to display an image upgrade screen, different to the game play screen, the image upgrade screen having one or more options for upgrading the upgradable image; and in response to user input received via the user interface selecting one or more of the options for upgrading the upgradable image, providing by the at least one processor a first upgraded image, wherein when a respective level of the computer implemented game is played, the first upgraded image is displayed in the second area of the respective game play screen, wherein one or more of the items are associated with a recipe.

30. A computer program product stored in a non-transitory computer-readable medium, the computer program product comprising instructions which, when implemented by the at least one processor, cause a computer device to be configured to provide a computer implemented game, the at least one processor being configured to:
   cause a display of the computer device to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;
   cause, in response to collecting of one or more first game objects, one or more items to be provided in the second area of the display, the items being to satisfy one or more game objectives associated with the second area of the game play screen;
   cause the display to display an image upgrade screen, different to the game play screen, the image upgrade screen having one or more options for upgrading the upgradable image; and
   in response to user input received via the user interface selecting one or more of the options for upgrading the upgradable image, providing a first upgraded image, wherein when a respective level of the computer implemented game is played, the first upgraded image is displayed in the second area of the respective game play screen,
   wherein one or more of the items are associated with a recipe.

31. A computer device configured to provide a computer implemented game, the computer device comprising a display, a user interface, at least one memory, and at least one processor wherein:
   the at least one processor is configured to cause the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;
   the at least one processor is configured, in response to collecting of one or more first game objects, cause one or more items to be provided in the second area of the display, the items being to satisfy one or more game objectives associated with the second area of the game play screen;
   the at least one processor is configured to cause the display to display an image upgrade screen, different to the game play screen, the image upgrade screen having one or more options for upgrading the upgradable image; and
   the at least one processor is configured in response to user input received via the user interface selecting one or more of the options for upgrading the upgradable image to provide a first upgraded image, wherein when a respective level of the computer implemented game is played, the first upgraded image is displayed in the second area of the respective game play screen,
   wherein the at least one processor is configured to determine that a first game object is collected in response to determining that a move made by a user via the user interface causes a match to be made on the game board adjacent a respective first game object.

32. A computer method providing a computer implemented game, the method being provided by a computer device configured to provide the computer implemented game and comprising a display, a user interface, at least one memory, and at least one processor, the method comprising:
   causing, by the at least one processor, the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;
   determining, by the at least one processor that a first game object is collected in response to determining that a move made by a user via the user interface causes a match to be made on the game board adjacent a respective first game object;
   causing, by the at least one processor in response to collecting of one or more first game objects, one or more items to be provided in the second area of the display, the items being to satisfy one or more game objectives associated with the second area of the game play screen;
   causing, by the at least one processor, the display to display an image upgrade screen, different to the game play screen, the image upgrade screen having one or more options for upgrading the upgradable image; and
   in response to user input received via the user interface selecting one or more of the options for upgrading the upgradable image, providing by the at least one processor a first upgraded image, wherein when a respective level of the computer implemented game is played, the first upgraded image is displayed in the second area of the respective game play screen.

33. A computer program product stored in a non-transitory computer-readable medium, the computer program product comprising instructions which, when implemented by the at least one processor, cause a computer device to be configured to provide a computer implemented game, the at least one processor being configured to:
   cause a display of the computer device to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;
   determine that a first game object is collected in response to determining that a move made by a user via the user interface causes a match to be made on the game board adjacent a respective first game object;
   cause, in response to collecting of one or more first game objects, one or more items to be provided in the second area of the display, the items being to satisfy one or more game objectives associated with the second area of the game play screen;

cause the display to display an image upgrade screen, different to the game play screen, the image upgrade screen having one or more options for upgrading the upgradable image; and in response to user input received via the user interface selecting one or more of the options for upgrading the upgradable image, providing a first upgraded image, wherein when a respective level of the computer implemented game is played, the first upgraded image is displayed in the second area of the respective game play screen.

34. A computer device configured to provide a computer implemented game, the computer device comprising a display, a user interface, at least one memory, and at least one processor wherein:

the at least one processor is configured to cause the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

the at least one processor is configured, in response to collecting of one or more first game objects, cause one or more items to be provided in the second area of the display, the items being to satisfy one or more game objectives associated with the second area of the game play screen;

the at least one processor is configured to cause the display to display an image upgrade screen, different to the game play screen, the image upgrade screen having one or more options for upgrading the upgradable image; and the at least one processor is configured in response to user input received via the user interface selecting one or more of the options for upgrading the upgradable image to provide a first upgraded image, wherein when a respective level of the computer implemented game is played, the first upgraded image is displayed in the second area of the respective game play screen, wherein the at least one processor is configured to determine that a first game object is collected in response to determining that a move made by a user via the user interface causes a booster game object to be triggered, the triggering of the booster object causing the first game object to be collected.

35. A computer method providing a computer implemented game, the method being provided by a computer device configured to provide the computer implemented game and comprising a display, a user interface, at least one memory, and at least one processor, the method comprising:

causing, by the at least one processor, the display to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

determining by the at least one processor that a first game object is collected in response to determining that a move made by a user via the user interface causes a booster game object to be triggered, the triggering of the booster object causing the first game object to be collected;

causing, by the at least one processor in response to collecting of one or more first game objects, one or more items to be provided in the second area of the display, the items being to satisfy one or more game objectives associated with the second area of the game play screen;

causing, by the at least one processor, the display to display an image upgrade screen, different to the game play screen, the image upgrade screen having one or more options for upgrading the upgradable image; and in response to user input received via the user interface selecting one or more of the options for upgrading the upgradable image, providing by the at least one processor a first upgraded image, wherein when a respective level of the computer implemented game is played, the first upgraded image is displayed in the second area of the respective game play screen.

36. A computer program product stored in a non-transitory computer-readable medium, the computer program product comprising instructions which, when implemented by the at least one processor, cause a computer device to be configured to provide a computer implemented game, the at least one processor being configured to:

cause a display of the computer device to display for a respective level of the computer implemented game a game play screen, the game play screen comprising a game board in a first area of game play screen and an upgradable image in a second area of the game play screen, the game board comprising one or more first game objects to be collected in response to user interaction via the user interface with the game board to play the respective level;

determine that a first game object is collected in response to determining that a move made by a user via the user interface causes a booster game object to be triggered, the triggering of the booster object causing the first game object to be collected;

cause, in response to collecting of one or more first game objects, one or more items to be provided in the second area of the display, the items being to satisfy one or more game objectives associated with the second area of the game play screen;

cause the display to display an image upgrade screen, different to the game play screen, the image upgrade screen having one or more options for upgrading the upgradable image; and in response to user input received via the user interface selecting one or more of the options for upgrading the upgradable image, providing a first upgraded image, wherein when a respective level of the computer implemented game is played, the first upgraded image is displayed in the second area of the respective game play screen.

* * * * *